United States Patent [19]

Reid

[11] 4,131,762
[45] Dec. 26, 1978

[54] BUFFER STORAGE ASSIGNMENT ARRANGEMENT FOR TIME-DIVISION SWITCHING SYSTEMS

[75] Inventor: Anthony Reid, Chicago, Ill.

[73] Assignee: Bell Telephone Laboratories, Incorporated, Murray Hill, N.J.

[21] Appl. No.: 796,971

[22] Filed: May 16, 1977

[51] Int. Cl.² .............................................. H04J 3/02
[52] U.S. Cl. ......................... 179/15 AQ; 179/15 AT
[58] Field of Search ........ 179/15 AQ, 15 AT, 18 EA

[56] References Cited

U.S. PATENT DOCUMENTS

| | | | |
|---|---|---|---|
| 3,736,381 | 5/1973 | Johnson et al. ................ | 179/15 AQ |
| 3,890,469 | 6/1975 | Kelly et al. ..................... | 179/15 AT |
| 3,927,267 | 12/1975 | Voyer et al. .................... | 179/15 AT |

Primary Examiner—Douglas W. Olms
Attorney, Agent, or Firm—Kenneth H. Samples; Peter Visserman

[57] ABSTRACT

A time-division switching system having a space-division network with a plurality of input terminals, each uniquely associated with a first buffer memory, and a plurality of output terminals, each uniquely associated with a second buffer memory, is disclosed. Time-shared communication paths through the space-division network are predominately completed such that digital data words representing signals from both parties to a conversation are transmitted through the space-division network during the same time slot. Normally, data words representing signals from telephone subscribers are assigned to first buffer memories in accordance with a fixed distribution plan. The system includes an arrangement which modifies the fixed distribution plan when it is determined that both parties to a conversation will have their data words stored in the same first buffer memory and switches data words representing signals from the called party of the conversation to an idle storage location in a different first buffer memory. An arrangement is also disclosed to recoordinate data words read from the second buffer memories to remove any possible conflicts caused by the redistribution of the input data words.

12 Claims, 21 Drawing Figures

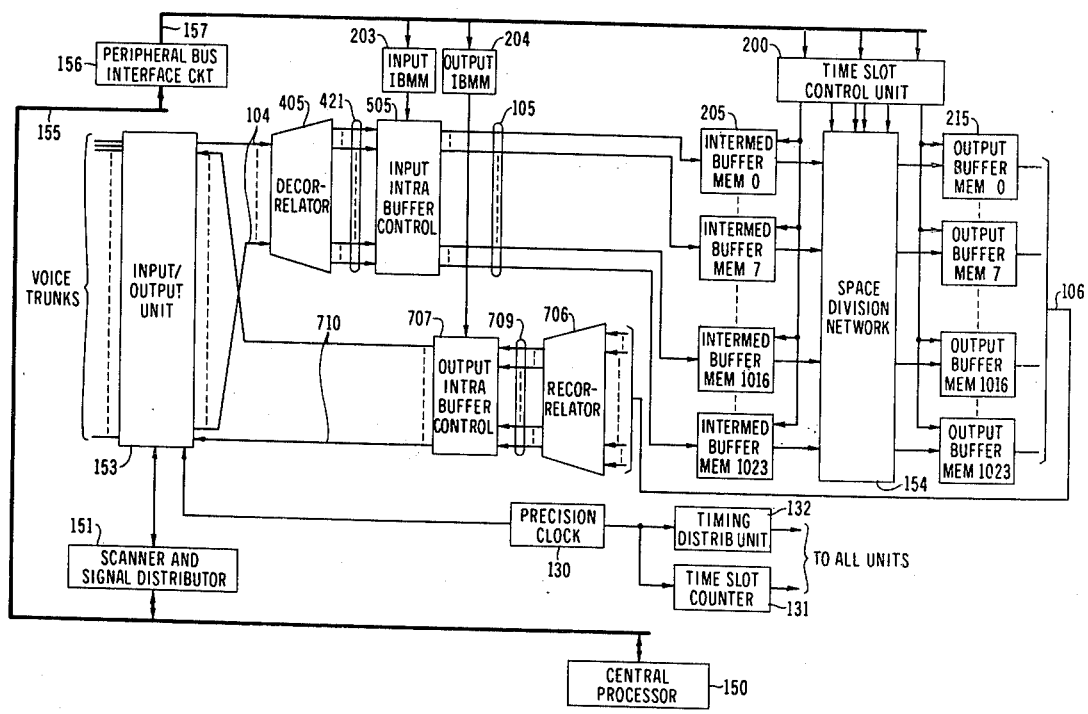

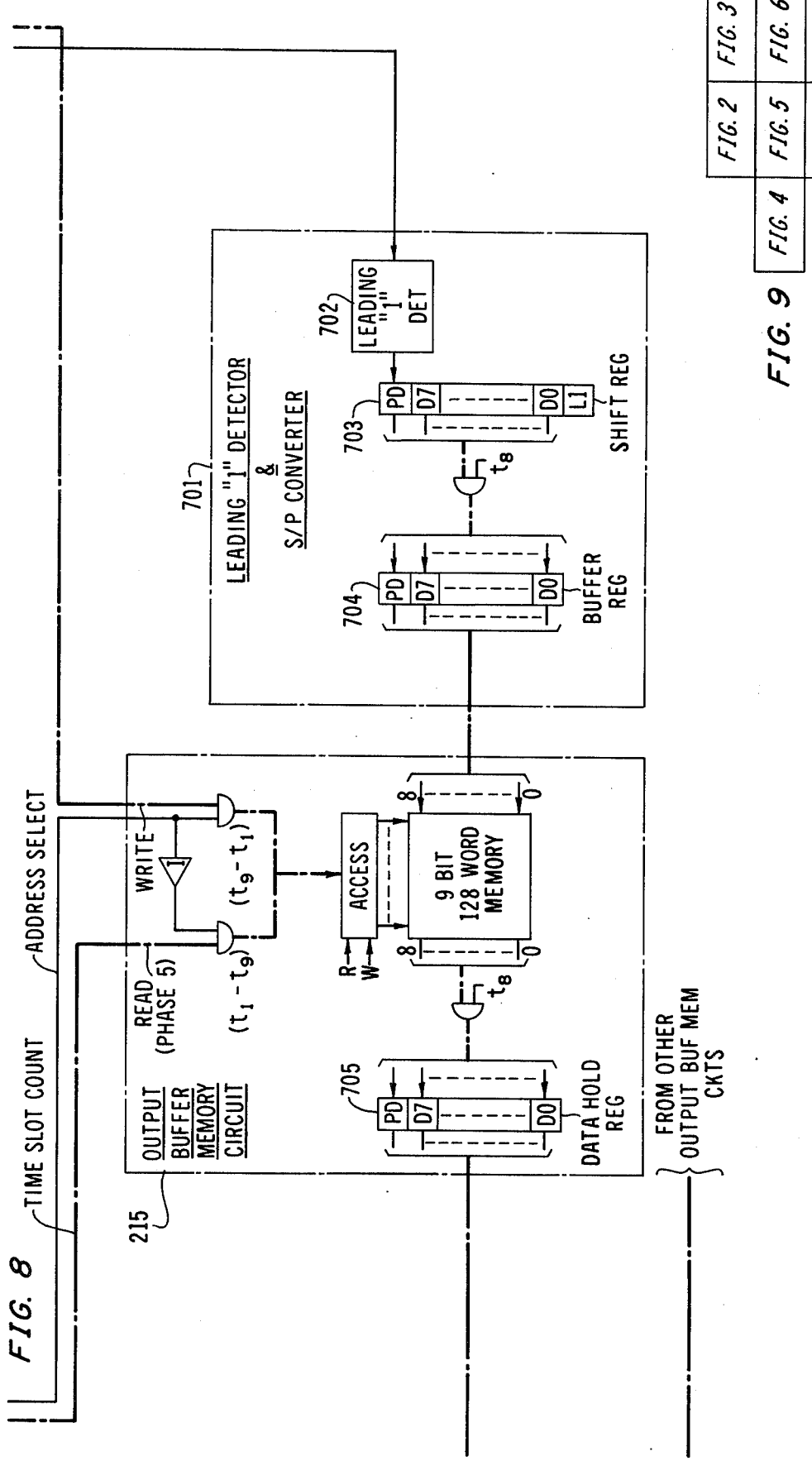

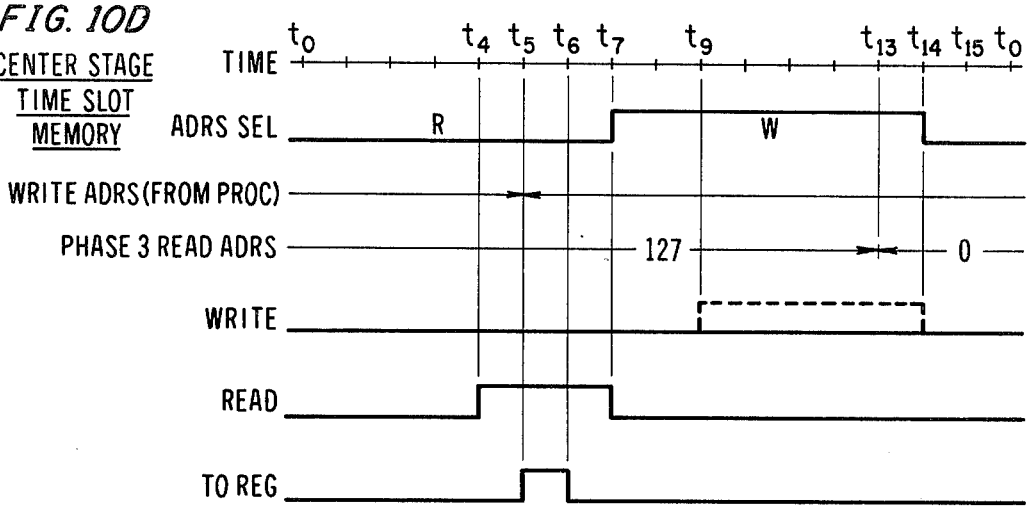
FIG. 10D CENTER STAGE TIME SLOT MEMORY
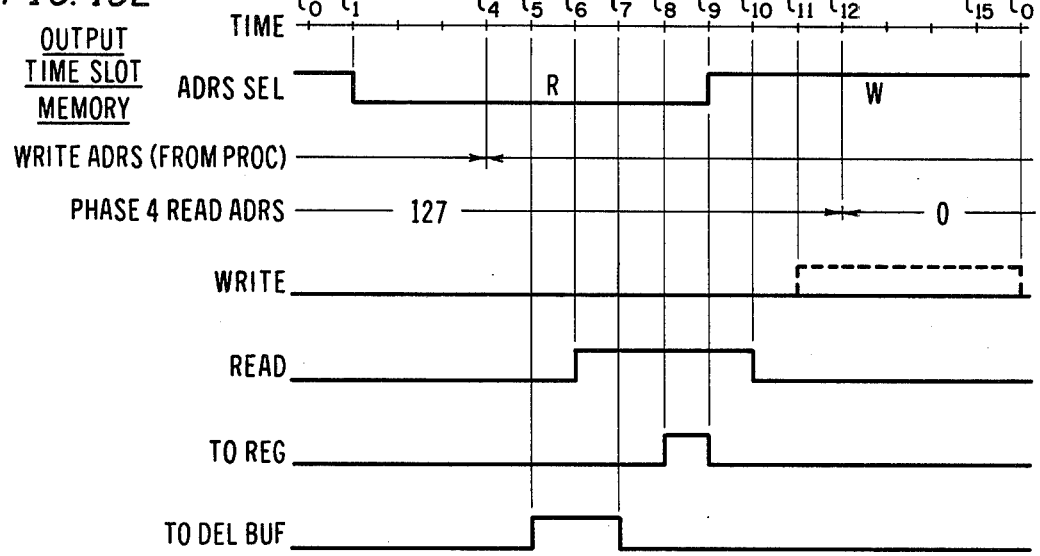
FIG. 10E OUTPUT TIME SLOT MEMORY
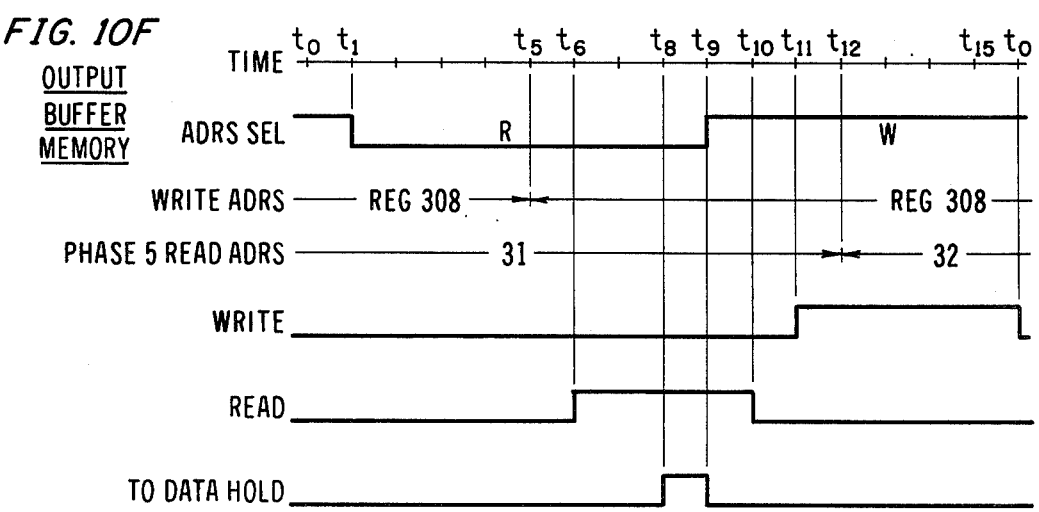
FIG. 10F OUTPUT BUFFER MEMORY

INPUT INTRA BUFFER MAP MEMORY

OUTPUT INTRA BUFFER MAP MEMORY

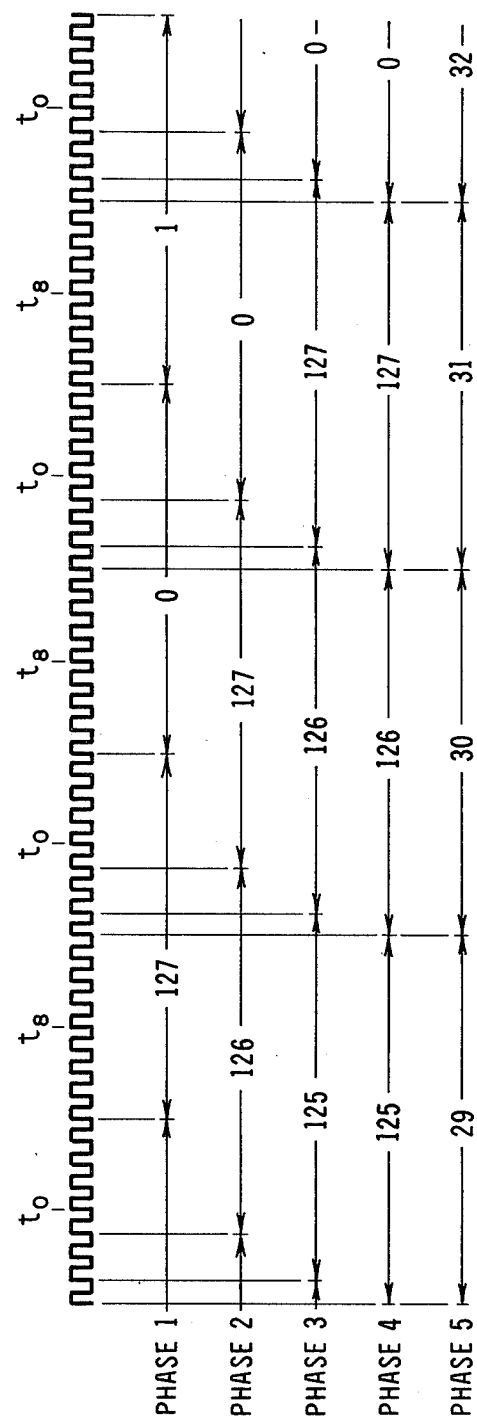

BUFFER STORAGE ASSIGNMENT ARRANGEMENT FOR TIME-DIVISION SWITCHING SYSTEMS

BACKGROUND OF THE INVENTION

This invention relates to time-division switching systems and more particularly to arrangements for improving the efficiency of communication path completion through such systems.

One type of known time-division switching system, referred to as a time-space-time (TST) system, comprises a first buffer memory stage, a space-division switching stage, and an output buffer memory stage. Data words representative of speech signals are received by the system, stored in the first buffer memory, selectively read from the first buffer memory and transmitted through the space-division network to the output buffer memory. In certain of these known time-space-time switching systems, such input port of the space-division network is uniquely associated with a first buffer memory and each output port of the space-division network is associated with a unique output buffer memory.

One time-division switching system of this last-mentioned type is described in the application H. E. Coonce et al., Ser. No. 701,604, filed July 1, 1976 now Pat. No. 4,064,370. In accordance with the H. E. Coonce et al., arrangement, data words are organized by the switching system in individual channels of one of a plurality of time-multiplexed lines. These data words are transmitted to and stored in a predetermined one of a plurality of intermediate buffer memories. The buffer memory, in which a given data word is stored, is predetermined by a fixed assignment algorithm. Also in accordance with the H. E. Coonce et al., arrangement, data words from the two parties of a call are communicated bi-directionally through the space-division network during the same time slot. That is, data words representing the signals from two communicating parties are read from their associated intermediate buffer memories and transmitted through the network to the two associated output buffer memories during the same time slot. Such a switching method can be maintained since available paths through the space-division network are assigned in a mirror image manner.

Occasionally, data words respresenting signals from both parties are stored, in accordance with the fixed assignment algorithm, in the same intermediate buffer memory. This is referred to as an intrabuffer call. When this occurs, bi-directional communication must employ two time slots since a given intermediate buffer memory can be accessed only once per time slot. The use of two time slots for the intercommunication of the two parties reduces the efficiency of the time-division switch and increases the central processor time required to control the switching system. It is an object of the present invention to reduce the number of conversations requiring two network time slots for intercommunication and to thereby increase the efficiency of the switching system.

SUMMARY OF THE INVENTION

A switching system in accordance with the present invention comprises a space-division network having a plurality of input and output terminals with a first buffer memory uniquely associated with each input terminal and an output buffer memory uniquely associated with each output terminal. The invention further comprises a distribution means for distributing data words to the first buffer memories in accordance with a first distribution plan and an arrangement responsive to requests for intercommunication betweeen the two parties to a call for modifying the first distribution plan when data words which are to be intercommunicated would, in accordance with the first distribution plan, be stored in the same first buffer memory and for storing those two data words in different ones of the first buffer memories.

In the embodiments of the invention which follow, a central processor, in response to call signaling information, determines which first (intermediate) buffer memories are associated with the two parties of each call. When it is determined that different first buffer memories are associated with the two parties, the call is completed in accordance with the above-mentioned H. E. Coonce et al., application. Alternatively, when it is determined that both the calling and called parties would, in accordance with the first distribution plan, be associated with the same first buffer memory, the first distribution plan is altered by circuitry which forms a part of the present invention so that the called and calling parties are associated with different first buffer memories. Additionally, a similar arrangement is employed on the output side of the space-division network to compensate for changes made in the first distribution plan on the input side of the space-division network.

By reducing the number of intrabuffer calls, network capacity can be increased since fewer calls require two time slots for network path completion. Additionally, less central processor time must be spent in performing translations and control memory undate functions since fewer calls require two separate paths.

BRIEF DESCRIPTION OF THE DRAWING

FIGS. 2 through 8, when arranged in accordance with FIG. 9, illustrate the telephone switching system of FIG. 1 in more detail;

FIGS. 10A through 10H and FIG. 11 are timing diagrams representing the timing relationships within the embodiment;

DETAILED DESCRIPTION

Figure 1:
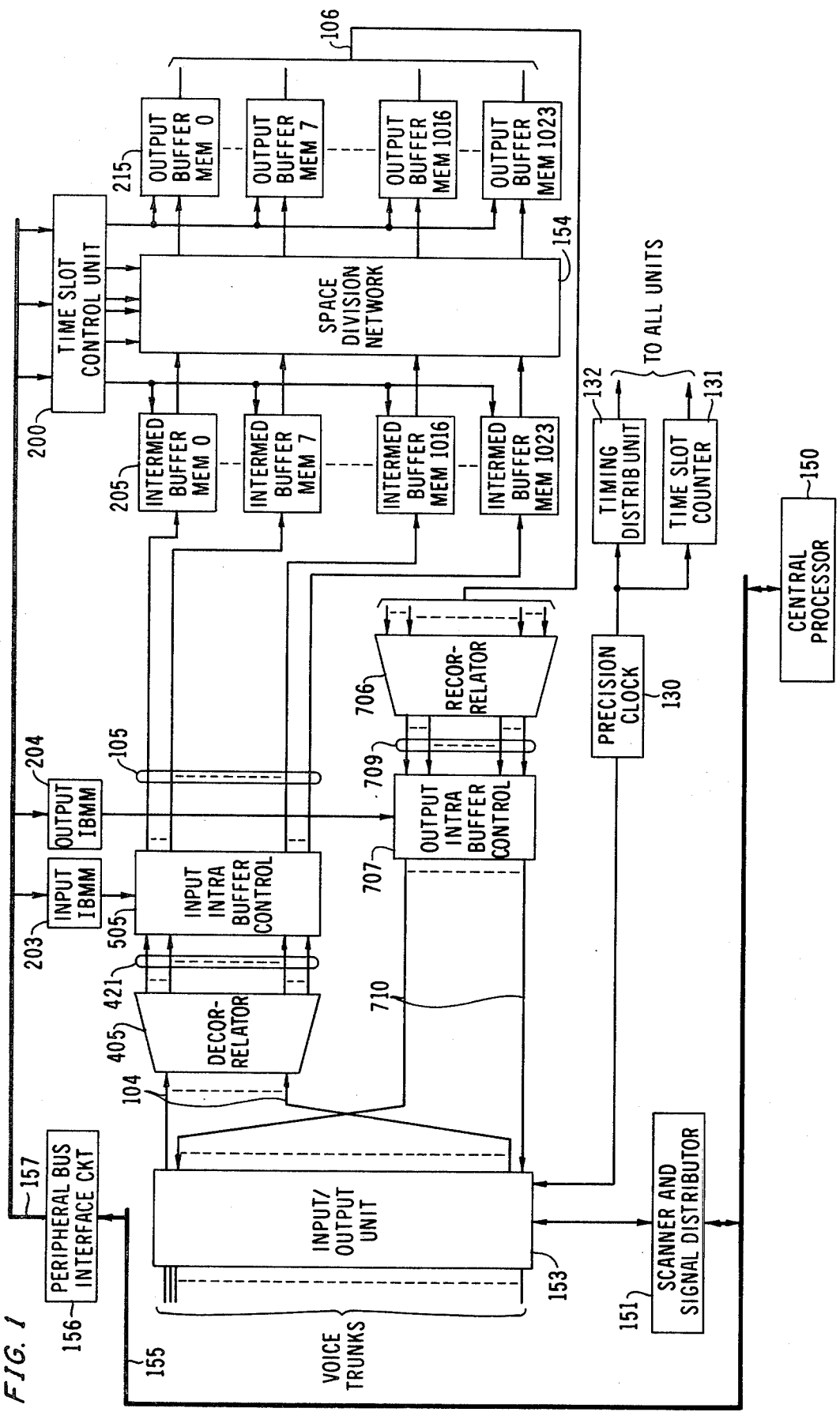
FIG. 1 is a block diagram of a telephone switching system embodying the invention.
Figure 2:
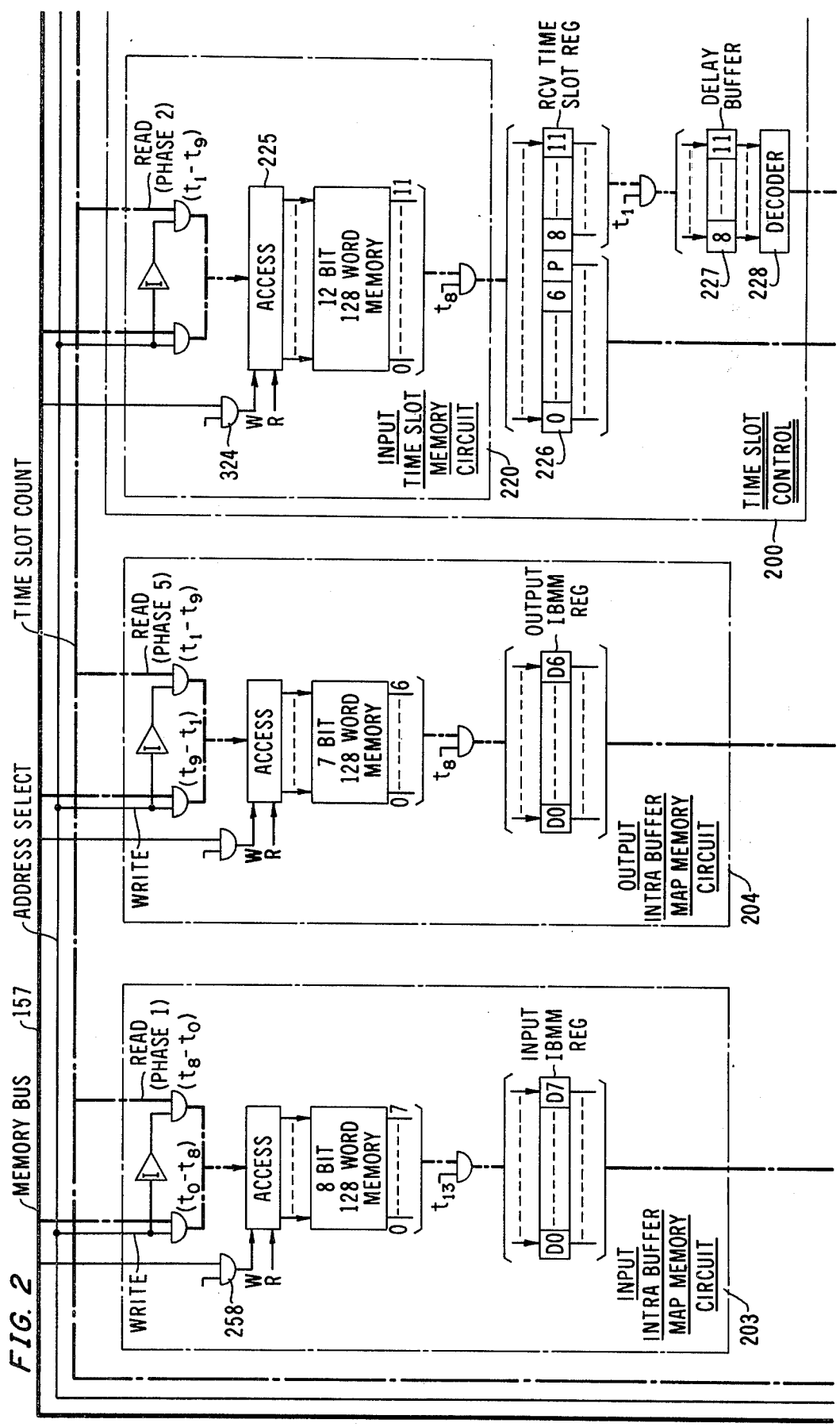
Figure 3:
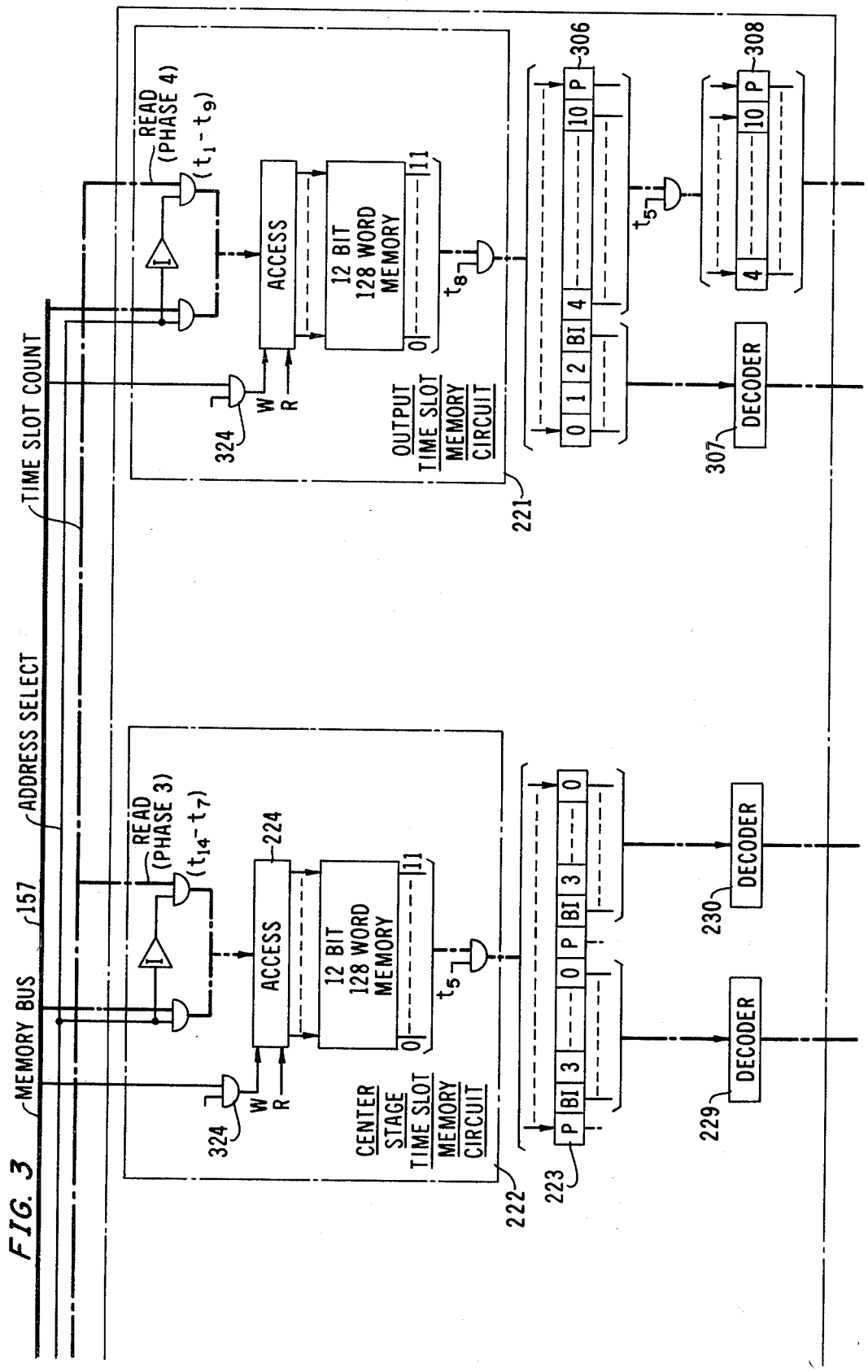

The illustrative toll telephone system selectively establishes communication paths between communication lines which extend from a toll office to other telephone offices. These communication lines may be voice frequency trunks carrying analog signals or time-multiplexed lines carrying digital data. The illustrative system of FIG. 1, which is equipped to switch information among approximately 100,000 voice frequency trunks, comprises an input/output unit 153 to which the voice frequency trunks are connected.

The illustrative system further includes a central processor 150 which communicates with a peripheral unit referred to herein as the combined scanner and signal distributor 151. The scanner and signal distributor 151 autonomously scans all the trunks having an appearance on input/output unit 153 changes in their supervisory states annd receives signaling information from the trunks. The combined scanner and signal distributor 151 communicates with the central processor 150 via a peripheral bus 155 and is responsive to commands from the central processor 150 to relay information to the processor and to transmit signaling information on the voice frequency trunks. In response to information transmitted from the scanner and signal distributor 151, central processor 150 computes the information required to switch signals from an incoming trunk to an outgoing trunk. As a part of the computation of the switching information, central processor 150 determines which ones of a plurality of intermediate and output buffer memory circuits will store the data words from each pair of trunks that are to be interconnected.

Input/output unit 153 samples the analog signals on each incoming trunk once every 125 microseconds and digitally encodes each analog sample. The product of this digital encoding operation is an eight-bit data word representing each analog sample and an associated parity bit. The data words and their associated parity bits are transmitted in parallel from input/output unit 153 to an input data word distributor 405 via one of a plurality time-multiplexed lines 104 in 125 microsecond frames where each frame comprises 128 time-separated channels. The period of time allotted for each channel is referred to as a time slot, and it has a time duration of approximately 976 nanoseconds. As used herein, the term "time slot" means an approximately 976-nanosecond period of time which may or may not coincide identically in time with other time slots or with the various time-multiplexed channels.

Input data word distributor 405 functions in accordance with a fixed distribution plan to transmit each data word it receives on one of the time-multiplexed lines 104 in a predetermined channel on one of 1,024 time-multiplexed lines 421 to an input intrabuffer control unit 505. The number of time-multiplexed lines 104 is less than the 1,024 time-multiplexed lines 421. Accordingly, with full occupancy of the time-multiplexed lines 104, unoccupied channels will always exist on time-multiplexed lines 421. The particular channels which are unoccupied are determined by the input data word distributor 405, in such a manner that central processor 150 can predict which channels of which time-multiplexed line 421 will be unoccupied. Input intrabuffer control unit 505 transmits the data words it receives on time-multiplexed lines 421 to one of 1,024 intermediate buffer memory circuits 205 via one of 1,024 time-multiplexed lines 105.

When central processor 150, in computing the switching information, determines that the data words from two intercommunicating trunks would, in accordance with the fixed distribution plan, be stored in the same intermediate buffer memory (an intrabuffer call), it transmits control information to input intrabuffer map memory circuit 203. In response to this control information, input intrabuffer control unit 505 switches the data word associated with the called party of the intrabuffer call to an idle channel of one of time-multiplexed lines 105 which is associated with a different intermediate buffer memory circuit 205. It should be noted that in accordance with the present invention, the data word associated with either the calling or the called party could be placed in the idle channel. The present embodiment, however, shifts the data word associated with the called party. It is remotely possible that the number of intrabuffer calls can exceed the number of unoccupied channels into which data words can be placed. If this should occur, the later occurring intrabuffer calls could not be "corrected" by input intrabuffer control unit 505 and they would be treated in accordance with the prior art arrangement.

The intermediate buffer memory circuits 205 receive data words via an associated one of the plurality of time-multiplexed lines 105. Each data word transmitted by input intrabuffer control unit 505 on a given time-multiplexed line 105 is written into the intermediate buffer memory circuit 205 associated with that time-multiplexed line at a location corresponding to the channel of the data word. In the absence of intrabuffer calls, the operation of the input data word distributor 405, the input intrabuffer control unit 505, and the write controlling arrangement of the intermediate buffer memory circuits 205 causes the data words representing analog signals on a given incoming voice trunk to be stored in a predetermined intermediate buffer memory circuit 205 at a predetermined storage location. When an intrabuffer call is present, each data word, except data words representing analog signals on the called trunk of the intrabuffer call, is stored in the same predetermined intermediate buffer memory circuit at the same predetermined locations, as in the nonintrabuffer call case. The data words from the called trunk of an intrabuffer call, however, are stored in an intermediate buffer memory circuit 205 assigned by central processor 150 at a location corresponding to a known idle channel.

Each buffer memory circuit comprises 128 word locations corresponding to the 128 channels of a time-multiplexed frame. Memories of this size were chosen for the illustrative system for the sake of simplicity, and it is to be understood that memories of a different size could be used, depending upon the rate of loading and unloading of the memories. Neither the memory elements nor the access circuitry for the memories are described in detail herein as the memory elements may be of any known type, such as semiconductor memories, and access circuitry for such memories is well known in the art. All of the buffer memories are capable of being both loaded and unloaded at specified locations during a single time slot. The loading and unloading are controlled in a manner described in detail later herein by addresses from a time-slot counter 131 and by timing signals from a timing distribution unit 132.

Each of the 1,024 intermediate buffer memory circuits 205 is uniquely associated with one input port of the system time-shared space-division network 154. Data words are serially transmitted to the input ports of space-division network 154 at the maximum rate of one data word per intermediate buffer memory circuit per time slot under the partial control of information from central processor 150 which is stored within time-slot control unit 200. The time-slot control unit 200 contains information defining the address locations of the intermediate buffer memory circuits 205 from which data words are to be read and information defining the communication paths to be established through the space-division network 154.

In addition to 1,024 input terminals, space-division network 154 has 1,024 output terminals, each of which is uniquely associated with one of 1,024 output buffer memory circuits 215. In response to signals from a time-slot counter 131 and the timing distribution unit 132, the space-division network 154 is reconfigured once per time slot with a maximum of 1,024 communication paths being completed therethrough during each configuration. These communication paths are assigned such that data words from two intercommunicating trunks are both transmitted during the same time slot. By the operation of the input data word distributor 405 and the input intrabuffer control unit 505, each trunk of each communicating pair of voice trunks is uniquely associated with a storage location in a given one of the intermediate buffer memory circuits 205 for the period of time that the pair of trunks is communicating. When unoccupied channels into which data words can be placed are present, the input intrabuffer control unit 505 assures that the calling and called trunks of a communicating pair of voice trunks are associated with different ones of intermediate buffer memory circuits 205. Similarly, each voice trunk of each communicating pair of trunks is uniquely associated with a given storage location in a given one of the output buffer memory circuits 215 for the period of time that the pair of trunks is communicating.

The assignment of intermediate and output buffer memory circuits is symmetrical in nature. For example, when the calling and called parties of a communicating pair of voice trunks are associated with the first and the eighth intermediate buffer memory circuits respectively, the calling and called parties are associated with the eighth output buffer memory circuit and the first output buffer memory circuit respectively. Accordingly, the space-division network 154 is controlled such that the data word from the first intermediate buffer memory circuit will be switched to the eighth output buffer memory circuit and the data word from the eighth intermediate buffer memory circuit will be switched to the first output buffer memory circuit.

Once every time slot, data words are read from the output buffer memory circuits 215 and transmitted to an output data word distributor 706 via a plurality of time-multiplexed lines 106 shown in FIG. 1 as a single line. Each output buffer memory circuit 215 is uniquely associated with one of the time-multiplexed lines 106 and data words are transmitted in predetermined channels of their associated time-multiplexed line. The time-multiplexed format for lines 106 is the same as the format for time-multiplexed lines 105.

In the absence of intrabuffer calls, each storage location of output buffer memory circuits 215 corresponds to a unique one of the voice trunks connected to input/output unit 153. When an intrabuffer call exists, however, data words associated with the called trunk of the intrabuffer call will be stored in an output buffer memory circuit which is not normally associated with that voice trunk due to the alterations of normal operation caused by input intrabuffer control unit 505. This condition is corrected by circuitry to be described later herein.

Output data word distributor 706 functions in accordance with a fixed distribution plan to transmit each data word it receives from one of the time-multiplexed lines 106 in a predetermined channel on one of a plurality of time-multiplexed lines 709. The fixed distribution plan under which output data word distributor 706 operates is the complement of the fixed distribution plan under which input data word distributor 405 operates. An output intrabuffer control unit 707 receives each data word transmitted from output data word distributor 706 and functions in accordance with control words from an output intrabuffer map memory circuit 204 to return the data words, which were placed in a different intermediate buffer memory circuit 205 than "normal" by input intrabuffer control unit 505, to the time-multiplexed line 710 properly corresponding to their associated output trunk. Time-multiplexed lines 710 receive the data word outputs of output intrabuffer control unit 707 and convey them in time-multiplexed format to the input/output unit 153. Input/output unit 153 converts each channel of digital information received on time-multiplexed lines 710 to its analog equivalent which is applied to the outgoing trunk associated with the time-multiplexed line and channel of that data word.

In the absence of intrabuffer calls, data words representing speech signals on each voice trunk are uniquely associated with a given storage location in a given one of intermediate buffer memory circuits 205. Similarly, data words representing signals to be transmitted on each voice trunk are uniquely associated with a given storage location of a given output buffer memory circuit 215. When an intrabuffer call occurs, data words representing signals on the called trunks thereof are assigned by the input intrabuffer control unit 505 to a storage location in an intermediate buffer memory circuit 205, which is different than the intermediate buffer memory circuit 205 to which it would have been assigned in accordance with the fixed distribution plan. Data words representing signals on the calling trunk of the intrabuffer call are then switched by space-division network 154 to the storage location in the particular output buffer memory circuit corresponding to the location and intermediate buffer memory circuit assigned to the called party. This change of intermediate and output buffer memory circuit from "normal" is corrected by the output intrabuffer control unit 707 which places data words for the called trunk of an intrabuffer call back on the appropriate time-multiplexed line associated with the called trunk.

As previously mentioned, the transfer of data words from the intermediate buffer memory circuits 205 through the space-division network 154 to the output buffer memory circuits 215 is controlled by information stored in the time-slot control unit 200. Control words are read from time-slot memories in the time-slot control unit 200, and a new set of transfer paths is established in the network for each data word accessed from intermediate buffer memory circuits 205. Control information is written into the time-slot memories by the central processor 150 via the peripheral bus 155. The central processor 150 may be any known data processing machine capable of communicating with the telephone equipment of this illustrative system and capable of making the various calculations and translations necessary for the control of the system. A processor having such general capability is described in *The Bell System Technical Journal*, Volume 56, February, 1977, Number 2.

Most of the functions performed in the illustrative system are performed in repetitive operating cycles of approximately 976 nanoseconds each. In order to provide timing control for the various functional units a precision clock 130 generates a series of timing pulses approximately 61 nanoseconds apart (FIG. 11, line 1). A time slot (976 nanoseconds) for any given functional unit is thus defined by 16 consecutive timing pulses from precision clock 130. A timing distribution unit 132 receives timing pulses from the precision clock 130 and in response thereto generates a recurring sequence of timed control signals. The sequence of timed control signals generated by the timing distribution unit 132 repeats itself every 16 timing pulses. All of the timed control signals generated by timing distribution unit 132 begin and end at predefined ones of the timing pulses from precision clock 130. Thus, each sequence of timed control signals generated by timing distribution unit 132 has 16 basic times called $t_i$'s at which control signals can be started or stopped. For convenience in the written description and drawing, the specific times $t_i$ are designated $t_0$ through $t_{15}$.

Although each basic unit of the illustrative system is operated in repetitive cycles of approximately 976 nanoseconds, the specific functions performed by each basic unit may be different at any given time $t_i$.

As previously stated, synchronism is maintained in the illustrative system by timing pulses from precision clock 130. A time-slot counter 131 responds to signals from precision clock 130 to generate addresses for certain of the control and data memories employed in this system. The addresses generated by time-slot counter 131 comprise five sequential address series, each being offset in phase from other address series. Each address series comprises a repetitive sequence of 128 addresses from 0 through 127, and within any given series the address is changed once per time slot. These address series which are referred to as address phase 1 through address phase 5 are shown in FIG. 11 for a period of time near the operations with respect to address 0.

Figure 12:
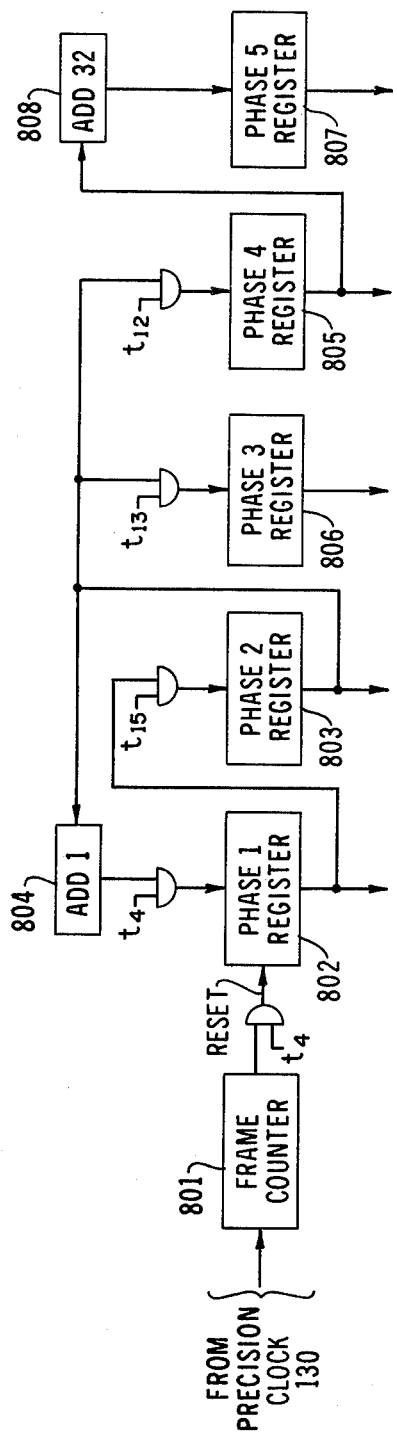
FIG. 12 is a block diagram of the time-slot counter employed by the disclosed system.

Time-slot counter 131 shown in FIG. 12 includes a frame counter circuit 801 which receives the timing pulses from the precision clock 130. Frame counter circuit 801 counts the pulses from the precision clock 130 and generates a reset command during one time slot of every 128 time slots. The reset command is gated to a phase 1 register 802 at time $t_4$ which, in response thereto, is reset to zero. The output signals of the phase 1 register 802 comprise the phase 1 address sequence. At time $t_{15}$, the contents of the phase 1 register 802 are gated to a phase 2 register 803 which results in both registers storing the same address. The output signals of the phase 2 register 803 comprise the phase 2 address sequence and are applied to an add-one circuit 804. At every time $t_4$, the outputs of the add-one circuit 804 are gated to the phase 1 register 802 and replace its contents unless the phase 1 register 802 is then being reset. The result of the operations of the phase 1 and phase 2 registers, the add-one circuit 804, and the gates operated at time $t_4$ and $t_{15}$ is two offset recurring series of sequential addresses from 0 through 127 as shown in lines 2 and 3 of FIG. 11.

The outputs of the phase 2 register 803 are gated to a phase 4 register 805 at each time $t_{12}$ and to a phase 3 register 806 at each time $t_{13}$. The outputs of the phase 3 register 806 and the phase 4 register 805 are the phase 3 and the phase 4 address series, respectively. The output signals of the phase 4 register 805 are also applied to a phase 5 register 807 via an add-32 circuit 808. In this manner, the contents of the phase 5 register 807 are changed at the same time the phase 4 register 805 is changed, but the contents of the phase 5 register 807 are an address 32 greater. The exact number 32 is not essential to the operation of the illustrative system, and it is chosen merely to provide a separation between the location written in output buffer memory circuits 215 and the location read from those same memories. The use of the address phases 1 through 5 is descibed in greater detail herein.

The following description is made with reference to FIG. 2 through 8 arranged in accordance with FIG. 9.

Figure 4:
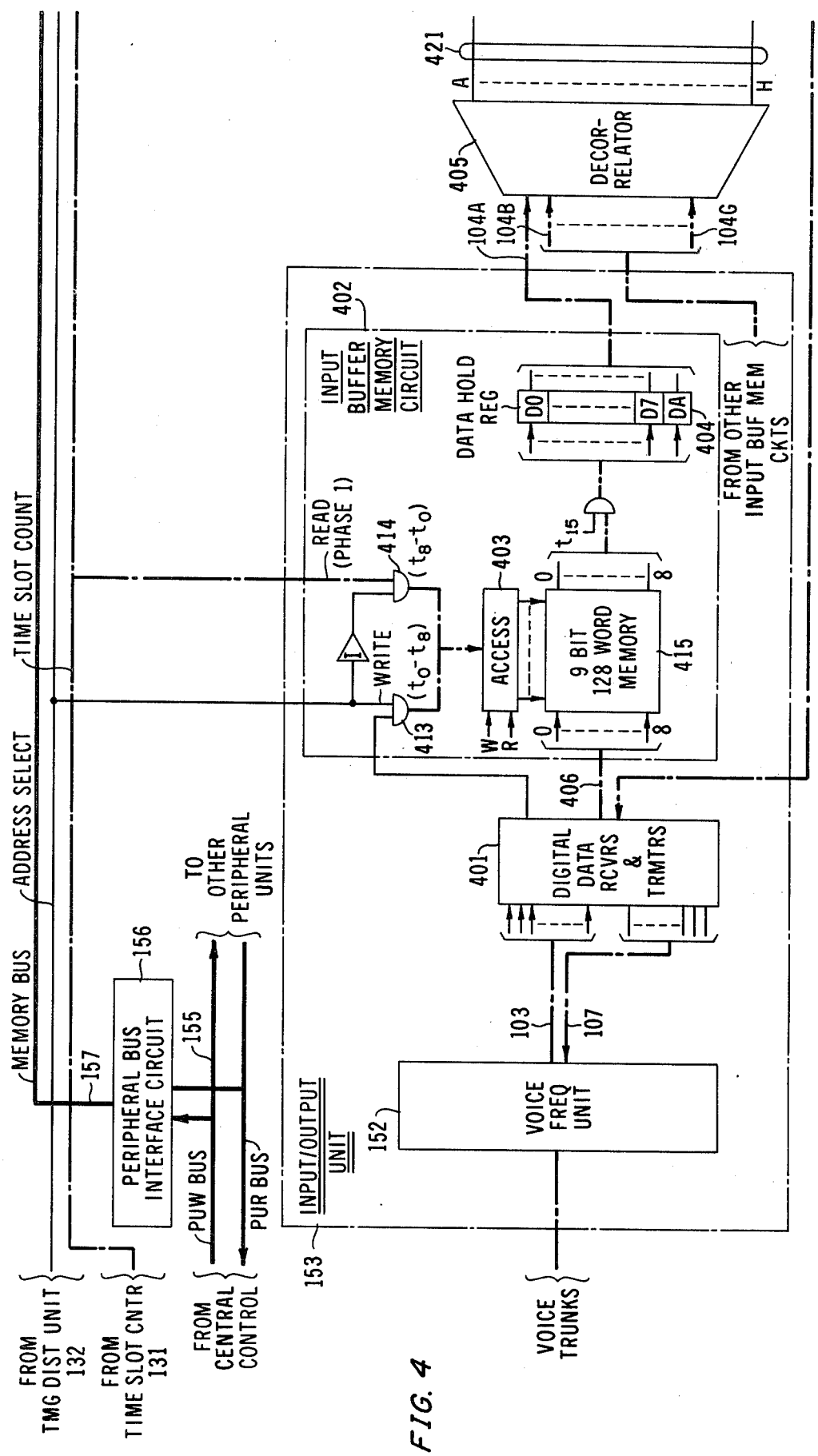

In FIG. 4 the input/output unit 153 is shown in more detail than in FIG. 1. Input/output unit 153 comprises a voice frequency unit 152 to which the voice frequency trunks are connected. Signals on voice frequency trunks are sampled every 125 microseconds, and a digital data word is generated to represent the sampled analog signal. The digital data words are transmitted in time-multiplexed format to a digital data receiver and transmitter unit 401 via one of a plurality of time-multiplexed lines 103. The digital data receiver and transmitter unit 401 synchronizes the incoming data words with the timing of the switching arrangement in a manner unimportant to the invention described herein. An arrangement for digital data word transmission and synchronization is shown in the application H. E. Coonce et al., Serial No. 701,604 filed July 1, 1976 now U.S. Pat. No. 4,064,370. The synchronized data words, each comprising eight data digits and one parity digit, are gated to a plurality of input buffer memory circuits 402. Each input buffer memory circuit 402 is uniquely associated with one of a plurality of time-multiplexed buses 406 and each data word is gated from the digital data receiver and transmitter unit 401 to the associated input buffer memory circuit 402 in a predetermined channel on a predetermined one of the plurality of time-multiplexed buses 406. The digital data receiver and transmitter unit 401 also generates and transmits with each data word the channel address of that data word which is used as a storage address by the input buffer memory circuit 402. By the above channel and time-multiplexed bus assignment, the data words generated from the analog signals on any given trunk circuit are always stored in the same address location in the same input buffer memory circuit 402.

Each of the data and control memory units in this system includes an address selection circuit which responds to timed control signals from the timing distribution unit 132 to alternately gate read and write addresses to the memory access circuitry. This signal consists of a logical "1" for eight times $t_i$ which logical "1" gates the write address to the memory and a logical "0" for the remainder of the operating cycle which logical "0" gates the read address. FIGS. 10A through 10H show the various timed gating signals generated by the timing distribution unit 132 and address signals applied to the data and control memories employed in the illustrative embodiment. Accessing circuitry is also associated with each data and control memory circuit which receives specific read and write control signals from the timing distribution unit 132. These signals define the function to be performed in response to the address at its input. Additionally, each memory has at least one output register into which the output signals of the memory are gated at particular times.

The address selection signal (FIG. 10A, line 2) transmitted to input buffer memory circuits 402 is a logical "1" from $t_0$ to $t_8$ and logical "0" from $t_8$ to $t_0$. An AND gate 413 responds to this address select signal by gating the channel address generated by the digital data receiver and transmitter unit 401 to the memory access circuit 403 of input buffer memory circuit 402 from time $t_0$ to time $t_8$. From time $t_2$ to $t_7$ a logical "1" (FIG. 10A, line 5) is transmitted from timing distribution unit 132 to the write enable lead "W" of input buffer memory circuit 402. The memory access circuit 403 in response thereto controls input buffer memory circuit 415 to store the data word then present on its associated time-multiplexed bus 406 at the address from the digital data receiver and transmitter unit 401.

During the time period from $t_8$ to $t_0$, a logical "0" (FIG. 10A, line 2) is applied to the address selection circuit of input buffer memory circuit 402. This signal is inverted and applied to an AND gate 414, which in response thereto gates a read address to the memory access circuit 403. This read address is the current address of the phase 1 address sequence (FIG. 10A, line 4) from time-slot counter 131. The timing distribution unit 132 transmits a logical "1" to the read enable lead, designated "R", of memory access circuit 403 from time $t_{13}$ to $t_1$. In response to this logical "1", memory access circuit 403 controls the reading of input buffer memory circuit 415 at the address location defined by the phase 1 address sequence. At time $t_{15}$, the data word read from the input buffer memory circuit 415 in response to the read address is gated to a data hold register 404. The contents of the data hold register 404 are transmitted to one of the intermediate buffer memory circuits 205 via the decorrelator circuit 405 and an input intrabuffer control unit 505.

It should be mentioned that 128 decorrelator circuits are present in the illustrative system and that each receives inputs from seven input buffer memory circuits 402 and applies its outputs to eight time-multiplexed lines 421A through 421H. It is the function of the decorrelator circuits 405 to equalize the traffic load and to affect a reduction of the traffic load applied to the input ports of the switching network. The decorrelator circuits 405 act as both expanders and as distribution circuits. During each time slot, each decorrelator circuit 405 distributes, in accordance with a predetermined pattern, a data word from the same addresss location in each of its associated seven input buffer memory circuits 402 to seven of the eight time-multiplexed lines 421A through 421H associated therewith. Thus, during each time slot 128, groups of seven input buffer memory circuits 402 are transmitting data words through associated ones of 128 decorrelator circuits 405 to 128 groups of eight time-multiplexed lines 421.

Since, during each time slot, seven data words are distributed by decorrelator 405 to eight time-multiplexed lines 421A through 421H, one channel of one time-multiplexed line 421 will be idle during each time slot. The particular time-multiplexed line 421 having the idle channel is defined by the three least significant bits of the phase 1 address sequence in accordance with the following table 1:

| Phase 1 Address Sequence | TML 421 Unoccupied |
|---|---|
| XXXX000 | 421H |
| 001 | 421A |
| 010 | 421B |
| 011 | 421C |
| 100 | 421D |
| 101 | 421E |
| 110 | 421F |
| 111 | 421G |

A detailed description of a decorrelator circuit for use in the present invention is given in G. D. Johnson et al., U.S. Patent No. 3,736,381, issued May 29, 1973.

Data words on each group of eight time-multiplexed lines 421A through 421H, are transmitted to an input intrabuffer control unit 505. In the case of intrabuffer calls, input intrabuffer control unit 505 operates to transmit the data words which represent speech signals from the called party of the intrabuffer call to an intermediate buffer memory circuit 205 other than it would normally be transmitted to, removing the intrabuffer call conflict. This is implemented by transmitting the data word from a given channel of its associated time-multiplexed line 421 to the same channel of a different time-multiplexed line 105. The particular time-multiplexed line 105 on which the data word is transmitted is the one having the otherwise idle channel during the time slot of interest. In accordance with the present embodiment, the time-multiplexed line 421 having the idle channel can be determined from the three least significant bits of the phase 1 address sequence. Input intrabuffer control unit 505 includes a one out of eight decoder 507 which receives as inputs the three least significant digits of the phase 1 address sequence and generates a logical "1" on a selected one of its output conductors $X_0$ through $X_7$ in accordance with the following table 2:

| Phase 1 "Least Three" | Output Conductor Receiving Logical "1" |
|---|---|
| 000 | X7 |
| 001 | X0 |
| 010 | X1 |
| 011 | X2 |
| 100 | X3 |
| 101 | X4 |
| 110 | X5 |
| 111 | X6 |

The output conductor $X_0$ through $X_7$ which receives the logical "1" from decoder 507 identifies which time-multiplexed line 421 has the unoccupied channel during each time slot.

Associated with each input intrabuffer control unit 505 is an input intrabuffer map memory circuit 203 which stores information defining which time-multiplexed line 421A through 421H, if any, contains a data word which should be transferred by input intrabuffer control unit 505 to the unoccupied channel during a given time slot. That is, input intrabuffer map memory circuit 203 defines which incoming data word, if any, during each time slot represents signals from the called party of an intrabuffer call. Each input intrabuffer map memory circuit 203 has 128 addressable storage locations, each containing eight control bits. Each addressable storage location of input intrabuffer map memory 203 is associated with one of the 128 channels per frame on time-multiplexed lines 421, and each control bit within each location is uniquely associated with a predefined one of the time-multiplexed lines 421A through 421H. The addressable storage locations of input intrabuffer map memory circuit 203 are accessed in sequence in accordance with the phase 1 address sequence such that a new control word is available during each data word channel. A logical "1" control bit defines that the data word on the time-multiplexed line 421 with which it is associated should be transferred to the unoccupied channel during the time slot it is accessed from input intrabuffer map memory circuit 203. A logical "0" control bit defines that no such transfer should take place.

Figure 5:
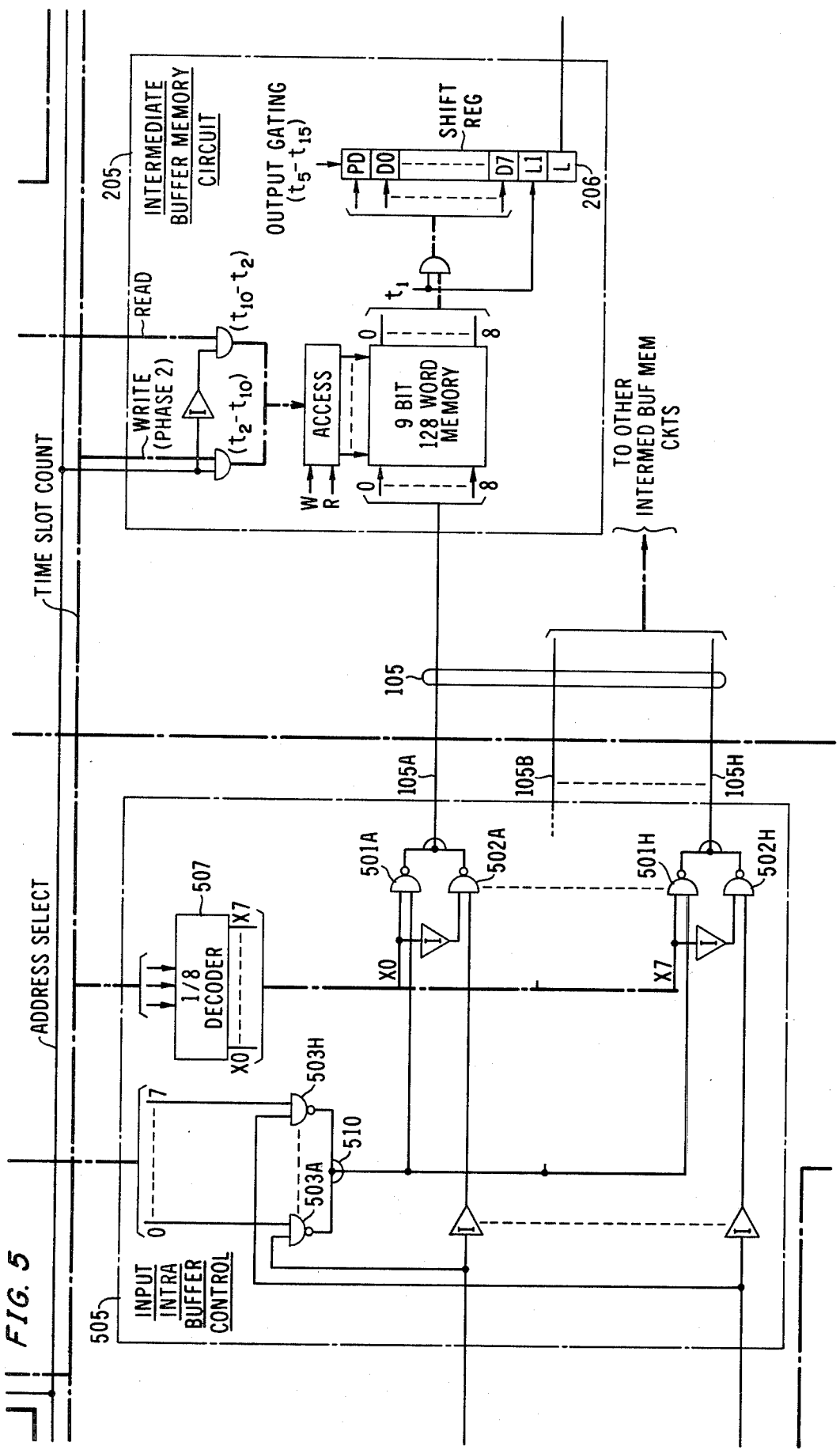

Input intrabuffer control unit 505 includes eight pairs of NAND gates 501A and 502A through 501H and 502H. The NAND gates 501 and 502 of each pair have their output conductors connected in a wired AND gate. It should be noted that each of the NAND gates numbered 501, 502, and 503 represent nine such NAND gates, controlled in parallel so that an entire data word can be transmitted in parallel therethrough. Further, each of the NAND gates shown in FIG. 5 is designed such that any two or more NAND gate outputs (collectors) can be wired together to perform the AND function. The output of each wired AND gate formed by the output conductors of each pair of NAND gates 501 and 502 is one of the time-multiplexed lines 105.

Each of the time-multiplexed lines 421A through 421H is connected via an inverter to an input of a predetermined one of NAND gates 502A through 502H and is directly connected to a predetermined one of eight NAND gates 503A through 503H. In the drawing, associated ones of NAND gate pairs 501 and 502, NAND gate 503, time-multiplexed lines 421 and time-multiplexed lines 105 have the same letter suffix. The second input to each NAND gate 503 is a unique one of the eight control bits from input intrabuffer map memory circuit 203. As previously discussed, a control bit from input intrabuffer map memory circuit 203 is a logical "1" when the data word from its associated time-multiplexed line 421 is to be transferred to the unoccupied channel and is a logical "0" if no such transfer is to occur. The output signal from each NAND gate 503 is a logical "1" when it receives a logical "0" control bit from input intrabuffer map memory circuit 203 and it is the inverse of the data word digits when it receives a logical "1" control bit. The outputs of NAND gates 503 are combined in a wired AND gate 510, the output of which is connected as a common input to all NAND gates 501A through 501H. The output signals from AND gate 510 will be a logical "1" when all of the control bits applied to NAND gates 503 are logical "0", indicating that no transfer is to be performed. Alternately, the output of wired AND gate 510 will be the inverse of the data word digits from the time-multiplexed line 421 associated with a NAND gate 503, receiving a logical "1" control bit.

All NAND gates 501 receive on time-multiplexed line 421 the inverse of the bits comprising a data word which is to be transferred to the idle channel, if any is to be so transferred. NAND gates 502 receive as data inputs the inverted digits of a data word on their associated time-multiplexed line 421. The output signals on conductors $X_0$ through $X_7$ (see table 2) of decoder 507 determine which time-multiplexed line 105 receives signals from the wired AND gate 510 and which receives signals from its associated time-multiplexed line 421. The time-multiplexed line 105 associated with a NAND gate pair 501 and 502 which receives a logical "1" from decoder 507, will receive the outputs from wired AND gate 510. The time-multiplexed lines 105 connected to a NAND gate pair, receiving a logical "0" from decoder 507, will receive the signals from their associated time-multiplexed line 421.

The central processor 150 transmits control words to the input intrabuffer map memory circuit 203 via a peripheral bus 155, a peripheral bus interface circuit 156 and a memory control bus 157, when updating is required.

Figure 10A:
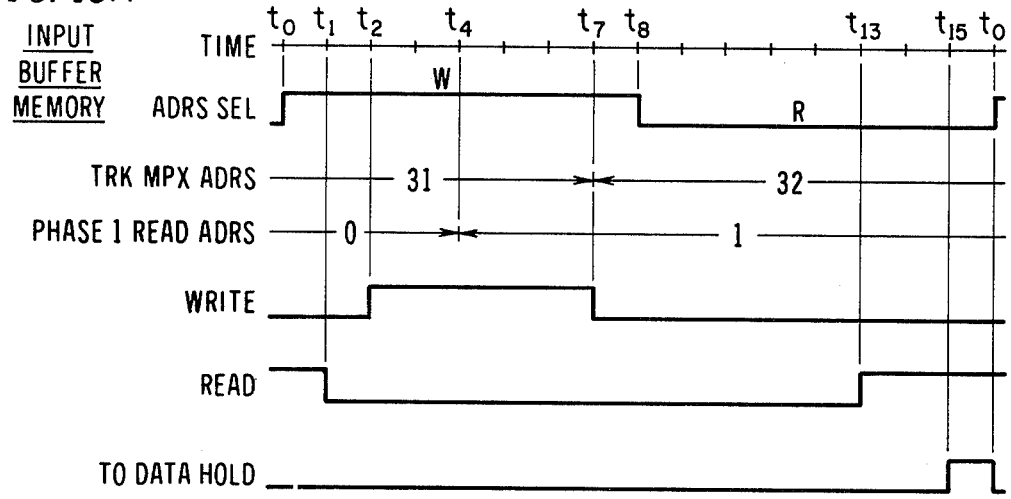
Figure 10B:
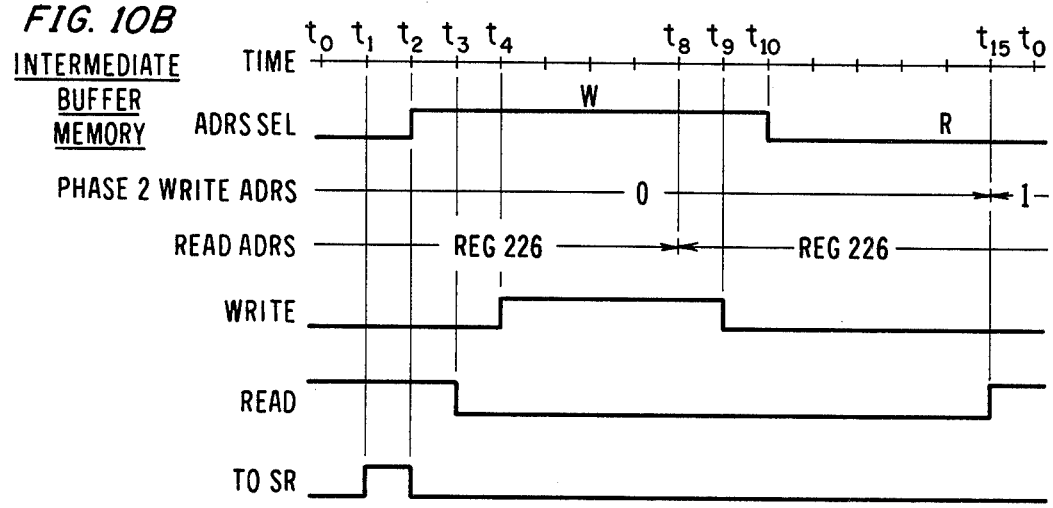
Figure 10C:
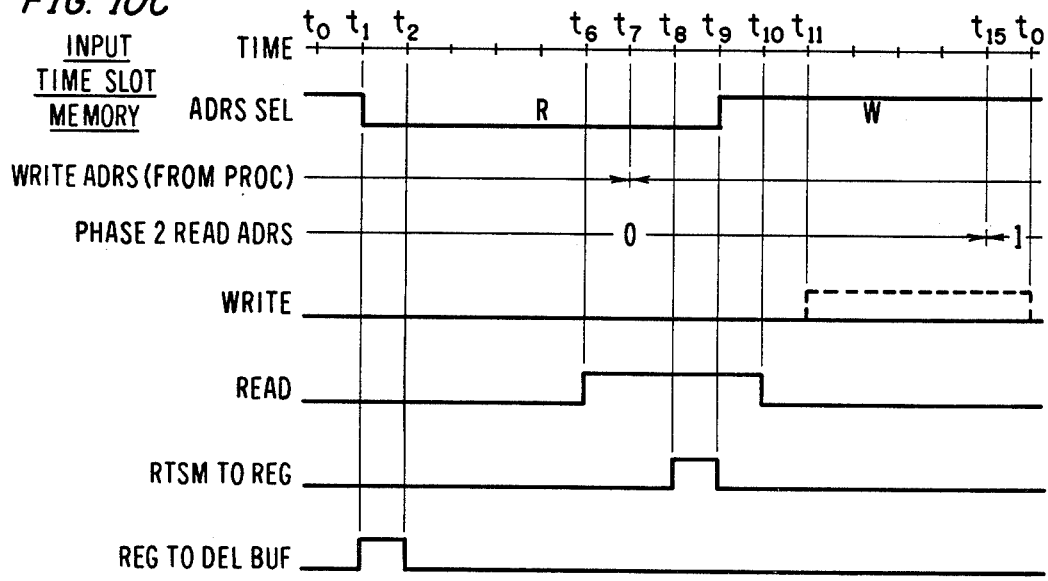
Figure 10G:
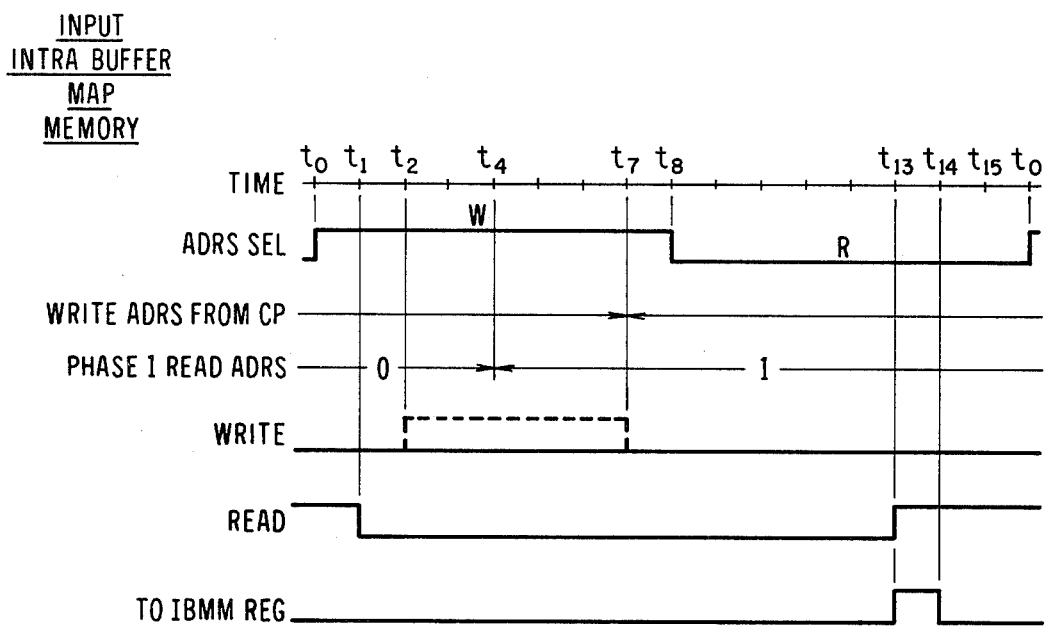
Figure 10H:
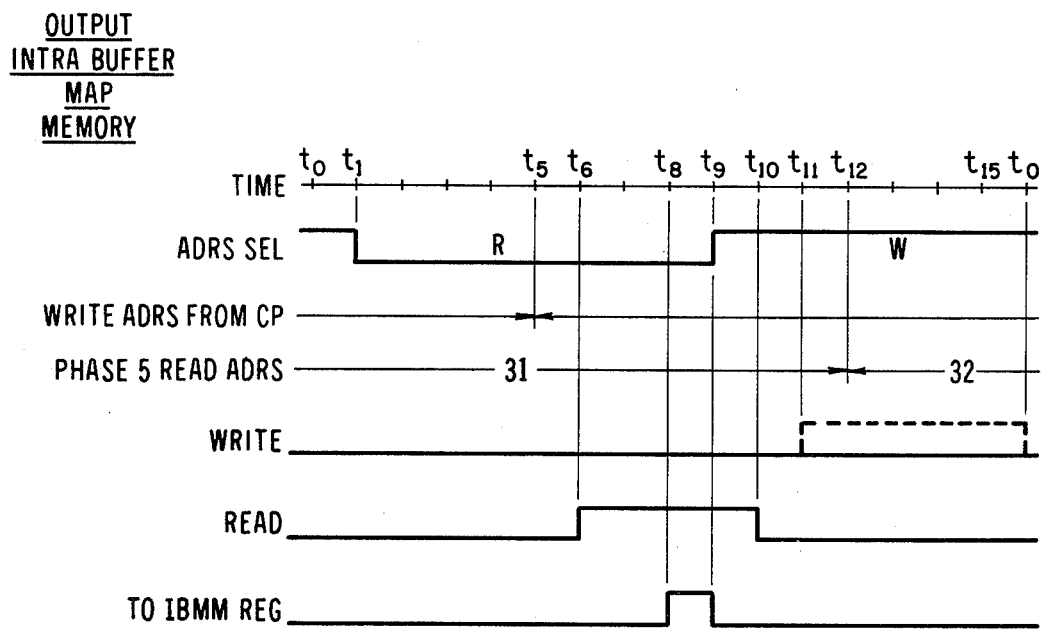

Each control word so transmitted is accompanied by a write address defining the particular input intrabuffer map memory circuit 203 to store the control word and the address within the memory where it is to be stored. Peripheral bus interface circuit 156 receives each control word and its associated address from central processor 150, and decodes that portion of the address defining which input intrabuffer map memory circuit 203 the control word is to be stored in and transmits the remaining address portion and the control word on memory control bus 157. In response to the memory defining address portion, the peripheral bus interface circuit 156 generates an enable signal which is transmitted from time $t_0$ to $t_8$ to the specific memory to be accessed. Each input intrabuffer map memory circuit 203 includes an AND gate 258 (FIG. 2), the output of which AND gate is connected to the write enable lead "W" of that memory. AND gate 258 receives as one input write control signals from timing distribution unit 132. The enable signal generated by peripheral bus interface circuit 156 is applied to the second input of the AND gate 258 of the selected input intrabuffer map memory circuit 203, enabling that AND gate to complete a path for a logical "1" write control signal from timing distribution unit 132. The input intrabuffer map memory circuit 203 thus is not written into during each time slot but is written only when the peripheral bus interface circuit 156 detects a control word to be written from central processor 150. The write control signals for the input intrabuffer map memory circuit 203 are shown in FIG. 10G as dotted lines, implying that they are not always gated to the write enable lead "W".

The following is an example of the operation of input intrabuffer control unit 505 which summarizes the above discussion and includes a description of the timing involved. This example is graphically represented in FIG. 13. For the purposes of this example, it is assumed that a calling party referred to as "ING" wishes to communicate with a called party referred to as "ED" and that input/output unit 153 associates the party "ING" with channel 0 of the time-multiplexed line 104A and the party "ED" with channel 2 of the time-multiplexed line 104G (see FIG. 13). In accordance with the previously described operation of decorrelator circuit 405, data words from both parties "ING" and "ED" will be transmitted from the decorrelator circuit 405 on time-multiplexed line 421A. This is an intrabuffer call situation. The presence of this intrabuffer call is detected in a manner described later herein in the initial stages of call processing by the central processor 150. Accordingly, central processor 150 determines that data words representing speech signals of the party "ED" should be transferred by input intrabuffer control unit 505 to the idle channel on time-multiplexed line 105 during channel 0. Since the operation of decorrelator circuit 405 is predetermined in accordance with table 1, central processor 150 determines that time-multiplexed line 421H contains the idle channel during channel 0. Accordingly, by means previously described, it transmits a control word to input intrabuffer map memory circuit 203 associated with the relevant input intrabuffer control unit 505 for the storage location associated with channel 0. This control word contains all logical "0s" except for a logical "1" in the bit position associated with time-multiplexed line 421A. No control word is transmitted to input intrabuffer map memory circuit 203 with regard to the party "ING" since only data words from the party "ED" are to be transferred.

From time $t_8$ to $t_0$, during the time slot indicated by the address sequence phase 1 to be address 0, data words representing speech signals from the party "ED" are read from input buffer memory circuit 415 and transmitted at time $t_{15}$ to data hold register 404. Also, at time $t_8$ through $t_0$, when the phase 1 address sequence indicates address 0, input intrabuffer map memory circuit 203 is read at word location 0. The control word read therefrom is transmitted to the input intrabuffer control unit 505 at time $t_{13}$. Accordingly, the logical "1" is applied to NAND gate 503A and logical "0s" are applied to the remaining seven NAND gates 503B through 503H. Also in response to the address 0 from the phase 1 address sequence, the decoder 507 generates a logical "1" on its output conductor $X_7$ (see table 2) which enables NAND gate 501H and inhibits NAND gate 502H. The data word on time-multiplexed line 421A is transmitted from decorrelator 405 to NAND gate 503A where it is inverted and applied to the outputs of AND gate 510. Since NAND gate 501H is enabled by the logical "1" on conductor $X_7$, the data word digits are again inverted and transmitted on conductor 105H, which previously contained the unoccupied channel for the channel 0. All of the other NAND gate pairs 501A, 502A through 501G, 502G transmit the information received on their associated time-multiplexed lines 421 to their associated time-multiplexed lines 105. It should be noted that the incoming information in channel 0 of time-multiplexed line 421A is transmitted through NAND gate 502A to time-multiplexed line 105A as well as being transmitted through NAND gate 501H to time-multiplexed line 105H. This presents no problem since only the data word in channel 0 of time-multiplexed line 105H will be transmitted through the switching network while the data word on time-multiplexed line 105A will never be read from its associated intermediate buffer memory circuit 205 during the course of this conversation.

Each time-multiplexed line 105A through 105H is uniquely associated with an intermediate buffer memory circuit 205. Accordingly, 1,024 (128 groups of eight) intermediate buffer memory circuits 205 are used in the present embodiment. Representations of the timing and addressing signals for the intermediate buffer memory circuits 205 are shown in FIG. 10B. The address selection circuitry for intermediate buffer memory circuits 205 is substantially the same as that described for input buffer memory circuits 402 except that, in response to address selection signals (see FIG. 10B, line 2) from the timing distribution unit 132, the write address is available from $t_2$ to $t_{10}$ and the read address is available from $t_{10}$ to $t_2$. The write address (see FIG. 10B, line 3) received by intermediate buffer memory circuits 205 comprises the phase 2 address sequence from time-slot counter 131. The write control signal (see FIG. 10B, line 5) generated by timing distribution unit 132 is received by the access circuitry on lead "W" of the intermediate buffer memory circuits 205 from $t_4$ to $t_9$. This results in the storage of the data words on time-multiplexed line 105 at the address defined by the phase 2 address sequence. The read addresses for intermediate buffer memory circuits 205 are transmitted from an input time-slot memory circuit 220, one of which is uniquely associated with each intermediate buffer memory circuit 205. These read addresses are the address locations within the associated intermediate buffer memory circuits 205 which define the data word which is to be transmitted through the switching network. For this reason all of the intermediate buffer memory circuits 205 are not necessarily read in response to identical addresses. The control words stored in input time-slot memory circuits 220 which define the intermediate buffer memory circuit 205 read addresses and the interconnection of calling and called trucks originate from the central processor 150.

Figure 6:
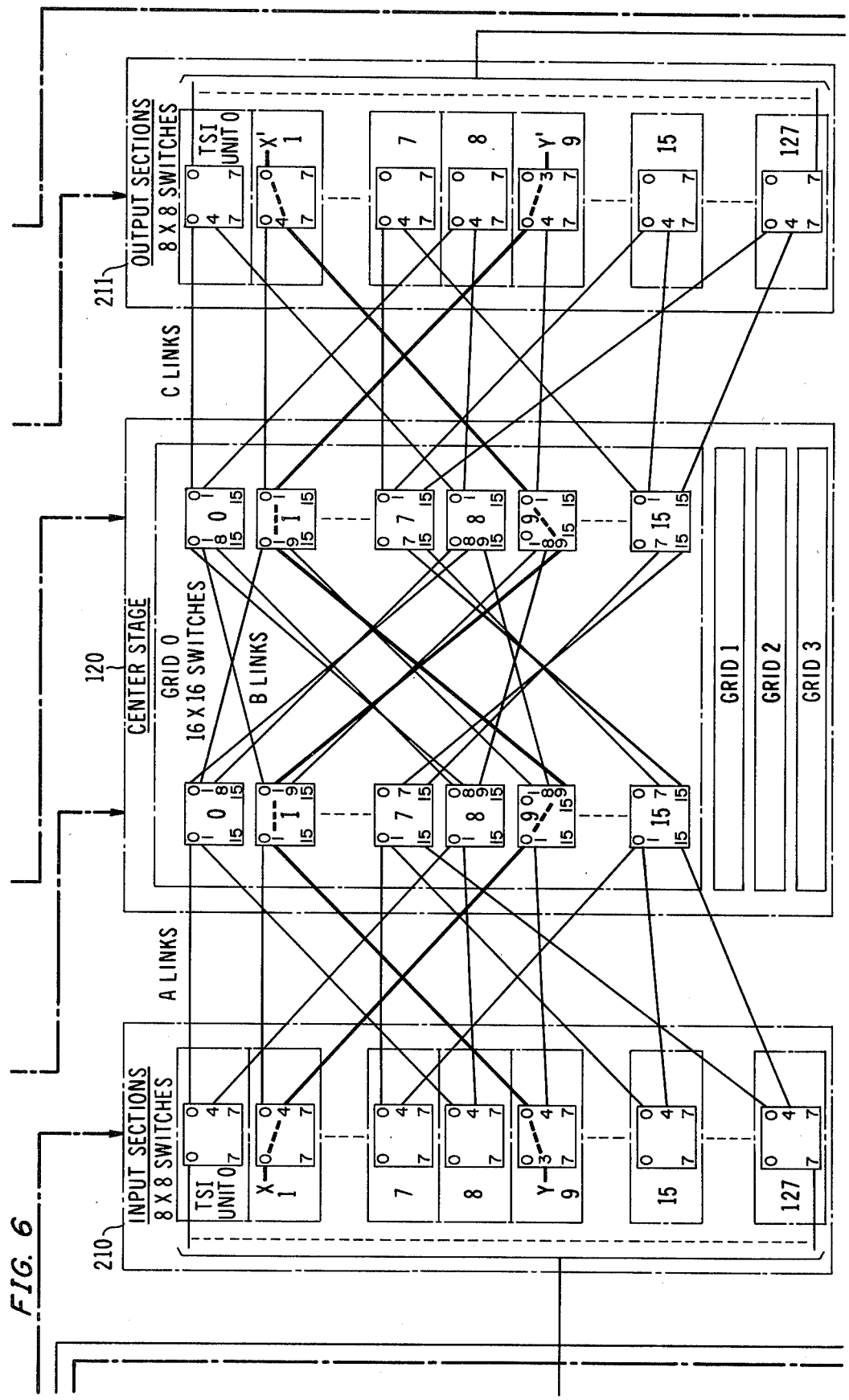
Figure 7:
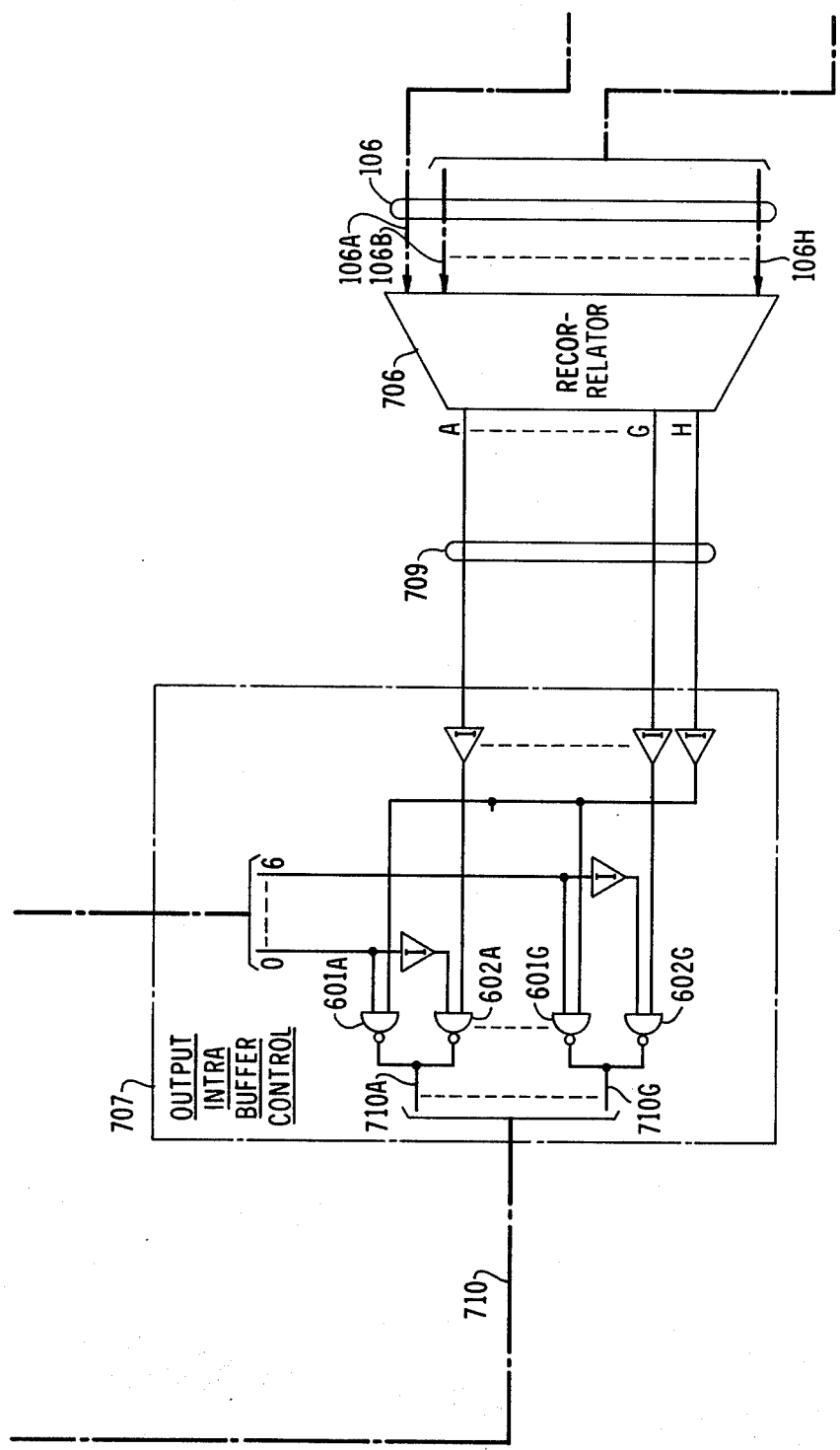

FIG. 6 shows the time-shared space-division network of the illustrative system. This network is completely symetrical, however, it is to be understood that a symmetrical network is not required to practice the invention. In the network of FIG. 6 the pattern of links interconnecting the network stages to the left of an imaginary center line drawn between the second and third stage switches of the space-division network is a mirror image of the pattern to the right of the center line. As previously described, during the course of a call there is an identifiable input port and output port associated with each voice trunk connected to the system. The network is time-shared and, therefore, a plurality of channels is associated with each port of the network. The network terminal designations are chosen such that the output port associated with a given voice trunk is given the same numerical designation as the input port associated with that trunk.

The input and output stages of the network each comprise 128 8×8 switches. The center portion of the network consists of four independent grids each comprising sixteen 16×16 second stage switches and sixteen 16×16 third stage switches. The switching element of the present switching network may advantageously be semiconductor switch elements. The various stages of the network are interconnected by means of links; the A links interconnect the first and second stages, the B links interconnect the second and third stages, and the C links interconnect the third and fourth stages. As described earlier herein, before a path can be established through the network the central processor 150 must hunt for idle paths in the network. In order to facilitate this path hunt, the central processor 150 maintains a record of the busy and idle status of the links of the network. By using a symmetrical network and complementary paths the processor needs to find only one idle A link, one idle B link, and one idle C link. Having found these three idle links, no further search is needed for the location of a second path since it is certain that the corresponding mirror image links are also idle. As a consequence the processor needs less memory space for storing link busy/idle information and requires less processor real time to perform the path hunt. Having determined the links to be employed the processor must compute the information for controlling the first, second, third, and fourth stage switches which interconnect the selected links. Because of the symmetrical nature of the network, the interconnections made between the second and third stage switches of the network are complementary. Consequently, less processor real time is required to generate control words. Furthermore, a single control word or portion thereof from one time-slot memory can simultaneously control a set of second stage switches and a corresponding set of third stage switches.

The central processor 150 transmits control words to the time-slot memories via a peripheral bus 155 when updating is required. Each control word so transmitted is accompanied by a write address defining the particular time-slot memory to store the control word and the address within the memory where it is to be stored. A peripheral bus interface circuit 156 receives each control word and its associated address from central processor 150 and decodes that portion of the address defining which time-slot memory the control word is to be stored in. In response to this address portion the peripheral bus interface circuit 156 generates an enable signal which is transmitted from time $t_8$ to $t_0$ to the specific memory to be accessed. Each time-slot memory includes an AND gate 324 (FIGS. 2 and 3) the output of which AND gate is connected to the write enable lead "W" of that memory. The enable signal generated by peripheral bus interface circuit 156 is applied to one input of the AND gate 324 of the selected time-slot memory, enabling this AND gate to complete a path for a logical "1" write control signal from timing distribution unit 132. The time-slot memories thus are not written into during each time-slot but are written only when the peripheral bus interface circuit 156 detects a control word to be written from central processor 150. The write control signals for the time-slot memories are shown in FIG. 10C, 10D, and 10E as dotted lines, implying they are not always gated to the write enable leads "W".

The input time-slot memory circuits 220 (FIG. 2) store control words which are used in part to control the input stage switches 210. Once each time slot, all of the input time-slot memory circuits 220 are read at the address defined by the phase 2 sequence and three bits of each resulting control word define one of the eight possible input stage switch output terminals, i.e., A links, to which the associated input port is to be connected. A fourth bit of the control word is a busy/idle bit which inhibits the establishment of the connecting path if the particular input portion is idle.

The center stage time-slot memory circuits 222 (FIG. 3) store control words for the control of the center stage switch unit 120. These are 512 center stage time-slot memory circuits 222 in the illustrative system and each controls switching paths associated with two center stage input terminals and two center stage output terminals. Once each time-slot all of the center stage time-slot memory circuits 222 are read and the resulting control words are stored in buffer registers 223. Each half of the contents of each buffer register 223 defines the path to be established through the center stage switches with respect to one center stage switch input terminal and the corresponding center stage switch unit output terminal. A first half word comprising five bits is used to establish, for example, a path from the 0th input of a given 16×16 input switch to a selected one of the 16 possible outputs, i.e., B links. Due to the mirror image network employed herein this same half word is used to establish a path through a third stage 16×16 switch from one of the 16 available B links to the 0th output terminal thereof. The remaining half of the contents of buffer register 223 is used in the same manner to establish connection paths with respect to a second input terminal of the second stage switch switch and the corresponding output terminal of the third stage switch. One bit of each word half is a busy/idle bit which inhibits the establishment of the connecting paths if its associated input and output terminals are idle.

The output time-slot memory circuits 221 (FIG. 3) store control words which are used in part to control the output stage switches 211. Once each time slot all of the output time-slot memory circuits 221 are read and three bits of the resulting control word defines the one of the eight possible C links to which its associated output port can be connected. A fourth bit of the control word is a busy/idle bit which inhibits the establishment of the connecting path if the path output port is idle.

It will be remembered that one input time-slot memory circuit 220 is associated with each intermediate buffer memory circuit 205. FIG. 10C represents the addresses and timed control signals applied to the input time-slot memory circuits 220. The read addresses applied to the accessing circuitry for input time-slot memory circuits 220 comprise the phase 2 address sequence generated by the time-slot counter 131. In accordance with address select signals (FIG. 10C, line 2) from timing distribution unit 132, which are used in the manner described with reference to the input buffer memory circuits 402, the read address is applied to a memory access arrangement 225 from time $t_1$ to time $t_9$. The read operation is commenced in response to a logical "1" read control signal (FIG. 10C, line 6) from timing distribution unit 132 from time $t_6$ to time $t_{10}$. Additionally, the 12-bit output generated by each input time-slot memory circuit 220 in response to the applied address is gated to an associated register 226 at time $t_8$. Bits 0–6 of the contents of this register 226 comprise the address used from time $t_{10}$ to $t_2$ to access the intermediate buffer memory circuit 205 associated with the input time-slot memory circuit 220.

At time $t_1$ the contents of bit positions 8–11 of registers 226 are gated to delay buffers 227. The signals stored in the delay buffers 227 are applied directly to decoders 228, one of which is uniquely associated with one input of the input stage switch 210. The one input with which each decoder 228 is associated is the input connected to the intermediate buffer memory circuit 205 which is controlled by the same input time-slot memory circuit 220. Also, at time $t_1$ the data word read from the intermediate buffer memory circuit 205 in response to the address from the register 226 of its associated input time-slot memory circuit 220 is gated to an 11-bit shift register 206. Further, bit position L1 of register 206 is set to a logical "1". After time $t_1$ shift register 206 stores the data word, its associated parity digit and the logical "1" start code. The logical "1" start code is detected at the output of the switching network to determine the presence of a data word. The 11th bit position, i.e., the one through which all bits are serially transmitted to the network, is set to a logical "0" so that a logical "0" is presented to the network at all times that a data word is not being transmitted.

The timing and control signals for the center stage time-slot memory circuits 222 are represented in FIG. 10D. In the manner previously described with reference to the input buffer memory circuits 402 a read address is applied to center stage time-slot memory circuits 222 from $t_{14}$ to $t_7$. The addresses so applied comprise the phase 3 address sequence from the time-slot counter 131. At time $t_4$ the timing distribution unit 132 transmits a logical "1" to the read enable lead "R" of access circuitry 224 for center stage time-slot memory circuits 222. The control word stored at the read address of each center stage time-slot memory circuits 222 is a 12-bit word which is gated to an associated buffer register 223 at time $t_5$. Each control word placed in buffer register 223 controls the establishment of a transmission path with respect to a specific two input terminals and a corresponding two output terminals of the center stage switch unit 120 in the manner previously described. These paths are established at approximately $t_6$.

At times $t_5$ through $t_{15}$ a series of 11 gating pulses is transmitted from timing distribution unit 132 to a shift control input of each shift register 206. Shift register 206 responds to these gating pulses by serially transmitting the start code and the data word to the switching network input associated with the intermediate buffer memory circuit 205. At time $t_1$ the read address from the phase 4 address sequence is applied to the accessing circuitry of the output time-slot memory circuits 221. These memories are read in response to a read control signal occurring from time $t_6$ to $t_{10}$ and the accessed contents of each memory are gated to an associated register 306 at time $t_8$. Four bits of the contents of register 306 are applied to a decoder 307. Decoder 307 in response thereto controls the output switching stages of the switching network. Thus, a path through the output stage of the switching network is established at approximately $t_9$ or one-half operating cycle after a path through the input stage was established.

Each output port of the switching network is uniquely associated with a detector arrangement 701 which in turn is uniquely associated with an output buffer memory circuit 215. A leading one detector 702 located in detector arrangement 701 detects the existence of a data word and stores that data word in a shift register 703. A leading one detector of the type described in U.S. Pat. No. 3,908,084 issued Sept. 23, 1975, can be used as leading one detector 702. The contents of each shift register 703 are gated in parallel at time $t_8$ to an associated buffer register 704. At time $t_5$ a portion of each output stage control word register 306 is gated to an associated delay register 308. The contents of delay registers 308 determine the address location in output buffer memory circuits 215 at which the contents of buffer register 704 are to be stored.

The storage in the output buffer memory circuits 215 takes place at time $t_{11}$ in response to a write control signal (FIG. 10F, line 5) from timing distribution unit 132. A read address from the phase 5 address sequence is applied to the accessing circuitry of output buffer memory circuits 215 from time $t_1$ to $t_9$. At time $t_8$ the contents of the accessed address locations of output buffer memory circuits 215 are gated to an associated data hold register 705. The outputs of each data hold register 705 are transmitted to a recorrelator circuit 706. Recorrelator circuit 706 serves to distribute data originating from eight network output ports and thus stored in eight output buffer memory circuits 215 onto eight time-multiplexed lines 709A through 709H in accordance with a distribution algorithm which is complementary to the distribution algorithm of the decorrelator circuit 405. A more detailed description of the recorrelator circuit 706 is given in the previously mentioned Johnson et al., patent.

Since recorrelator circuit 706 operates in accordance with an algorithm which is complementary to the algorithm of the decorrelator circuit 405, the data words conveyed on time-multiplexed lines 709A through 709G are in the proper channel of the proper time-multiplexed line for conversion back to analog signals by input/output unit 153. Time-multiplexed lines 709A through 709G, however, will have unoccupied channels which would be associated by input/output unit 153 with analog trunks corresponding to the called parties of intrabuffer calls. Time-multiplexed line 709H by operation of recorrelator circuits 706 transmits to the output intrabuffer control 707 each data word which had been transferred to an unoccupied channel by input intrabuffer control unit 505. Output intrabuffer control unit 707 functions to place the data words on time-multiplexed line 709H onto the appropriate time-multiplexed line 710 so that a proper conversion to analog will be made by the input/output unit 153.

Output intrabuffer control unit 707 receives control digits from an associated output intrabuffer map memory circuit 204, each of which contains 128 addressable storage locations, of seven bit lengths. Output intrabuffer map memory circuits 204 are read once per time slot in accordance with the phase 5 address sequence in a manner substantially identical to the manner of reading input intrabuffer map memory circuits 203. Accordingly, the control word stored in each addressable storage location is associated with a particular channel and each of the seven control digits is uniquely associated with one of the time-multiplexed lines 709A through 709G. Output intrabuffer control unit 707 includes seven pairs of NAND gates, of which the pairs 601A, 602A, and 601G, 602G are shown. It should be mentioned that each of the NAND gates 601 and 602 is actually nine NAND gates controlled in parallel so that they can pass an entire nine-bit data word in parallel. The output conductors of both NAND gates 601 and 602 in a NAND gate pair are connected in a wired AND gate 510, the output of which AND gate is one of the time-multiplexed lines 710A through 710G. Each of the NAND gates 602A through 602G receives, via an inverter, the data words on an associated one of time-multiplexed lines 709A through 709G. The data words on time-multiplexed line 709H are connected in common to each of the NAND gates 601A through 601G via an inverter.

A control digit stored by the output intrabuffer map memory circuit 204 is a logical "0" when its associated one of time-multiplexed lines 709A through 709G is not to receive a data word from 709H and it is a logical "1" when its associated one of time-multiplexed lines 709A through 709G is to receive a data word from time-multiplexed line 709H. The logical "0" control digit disables its associated NAND gates 601 and enables its associated NAND gate 602 to pass the data word from its associated one of time-multiplexed lines 709A through 709G. When a control bit is a logical "1", the associated NAND gate 601 is enabled to pass data words from time-multiplexed line 709H to the output time-multiplexed line 710 while the NAND gate 602 is disabled. Accordingly, by the operation of the output intrabuffer control unit 707, each data word received thereby on time-multiplexed lines 709A through 709H is transmitted in the proper channel of the proper time-multiplexed line 710 to input/output unit 153, where it is converted to analog signals and applied to the proper voice frequency trunk.

Figure 13:
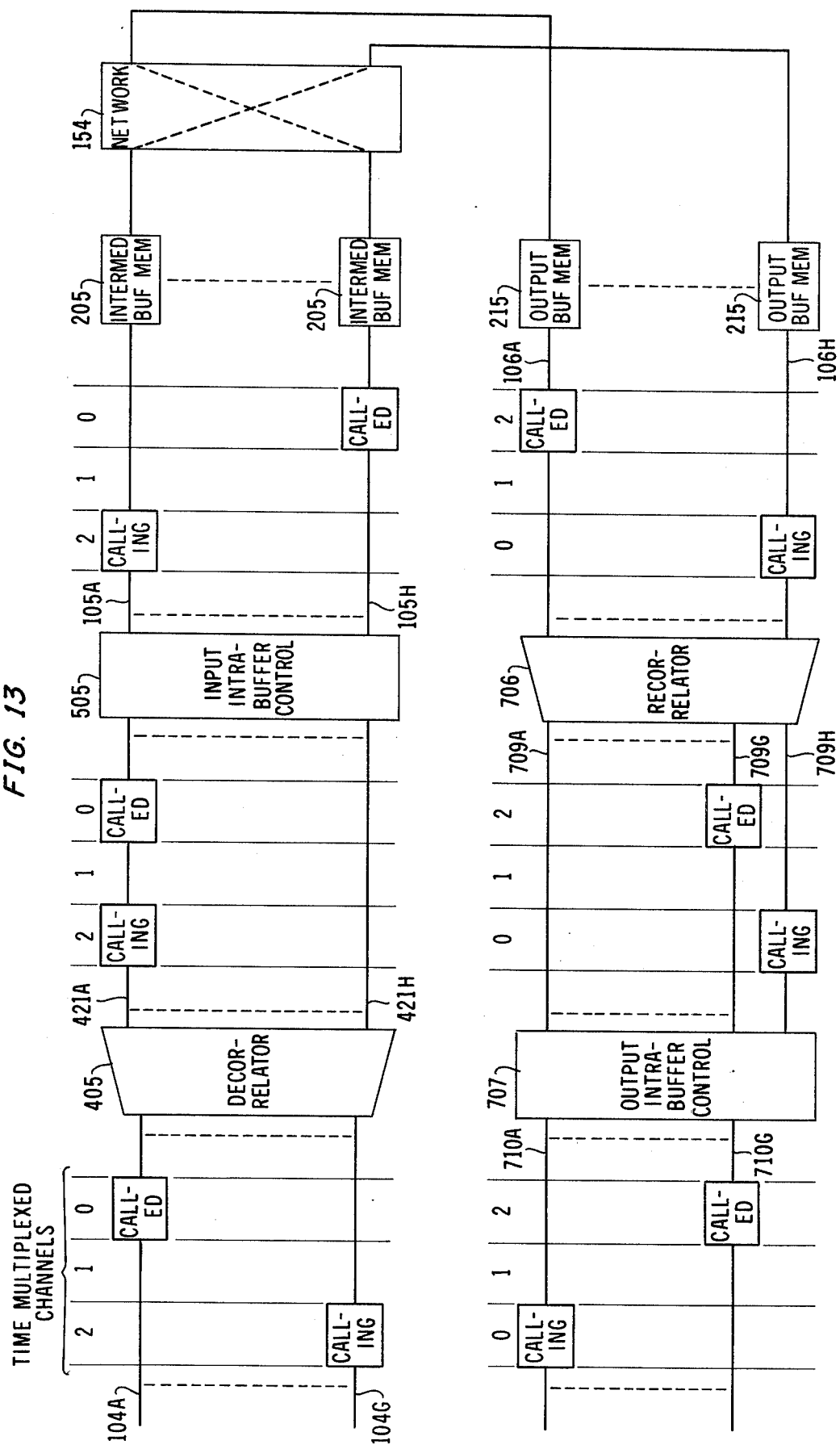
FIG. 13 is a graphic representation of an example of the operation of the present system.

The following is the continuation of the example previously described with respect to FIG. 13. In accordance with this example and the operation of the switching network shown in FIG. 6, signals from the party "ED" are in channel 2 of the time-multiplexed line 106A and data words from the party "ING" are associated with the 0th channel of the time-multiplexed line 106H received by recorrelator circuit 706. Recorrelator circuit 706, operating in a manner complementary to the decorrelator circuit 405, transmits data words from the party "ED" on channel 2 of time-multiplexed line 709G and data words from the party "ING" in channel 0 of time-multiplexed line 709H. During channel 0, in accordance with the phase 5 address sequence, the control word read from output intrabuffer memory circuit 204 contains a logical "1" associated with time-multiplexed line 710A. All other positions of this control word are logical "0". When the logical "1" is applied to NAND gate 601A (see FIG. 7), it is enabled to pass the incoming signals on time-multiplexed line 709H to time-multiplexed line 710A. No transfer is required by the output intrabuffer control unit 707 with regard to signals from the party "ED" of the present example, which signals are transmitted on conductor 710G. After the operation of the above arrangement, signals representing data words from the calling party "ING" are in channel "0" of time-multiplexed line 710A, which is associated with the called party "ED", and data words representing signals from the called party "ED" are transmitted on time-multiplexed line 710G in channel 2, which is associated with the calling party "ING" of the present example.

Figure 14:
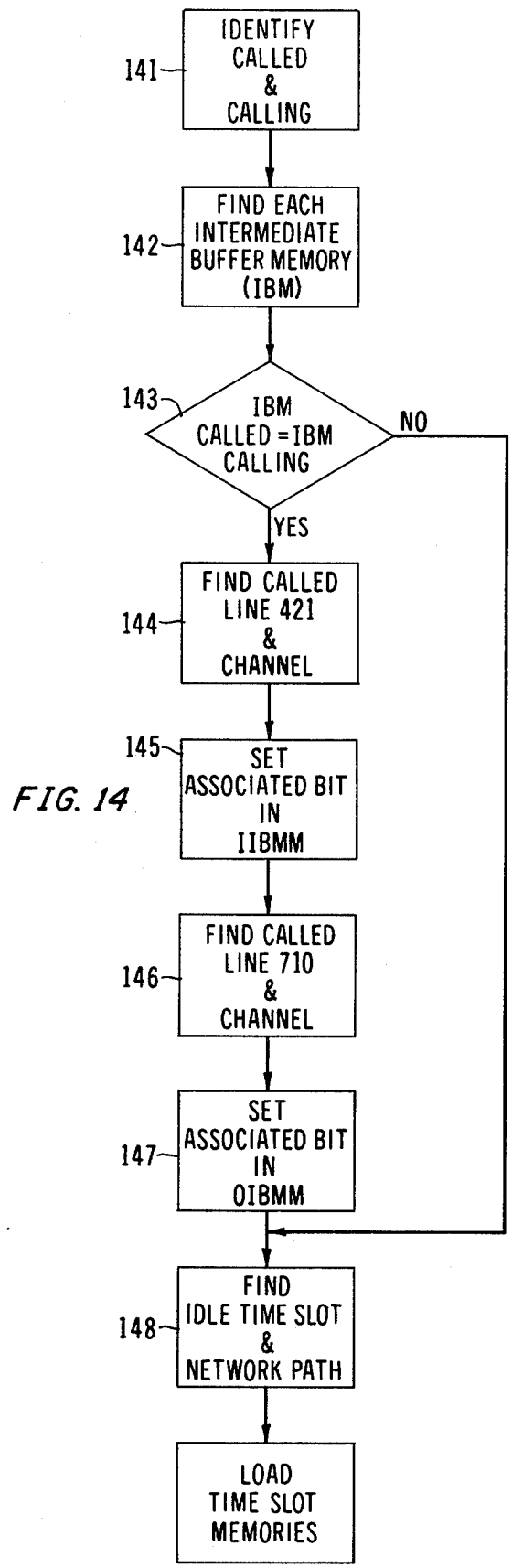
FIG. 14 is a description of the operation of the central control in the completion of a telephone call.

In the description which follows, each number in parenthesis, e.g., (14), relates to an equivalent functional block in FIG. 14. It will be recalled that the combined scanner and signal distributor 151 continuously scans the trunks for requests for service and, upon detection of such a request, passes this information, including information identifying the trunks requesting service, to the central processor 150. Upon command from the central processor 150, the combined scanner and signal distributor 151 begins to scan for incoming call signaling information, which is subsequently passed on to the central processor. The central processor interprets the call signaling information to identify the central office which is desired to be reached and selects an available outgoing trunk (called trunk) to that central office (14). FIG. 14 is a graphical representation of the translation functions performed by the central processor 150. By translation of the calling trunk identity information, the central processor determines the identity of the intermediate and output buffer memory circuits and the address locations in these memory circuits associated with the calling trunk (142). Similarly, by translation of the called trunk identity information, i.e., the selected trunk to the called office, the central processor determines the intermediate and output buffer memory circuits and the address locations in these memory circuits associated with the called trunk (142). In order to determine if an intrabuffer call exists, the identity of the intermediate buffer memory circuits associated with the called party is compared with the identity of the intermediate buffer memory circuit associated with the calling party (143). If this comparison indicates that the two parties are not associated with the same intermediate buffer memory circuit, the central processor 150 selects two simultaneously available network paths through the space-division network to connect the above-identified intermediate and output buffer memory circuits (148). One network path is used to transfer data words from the input port associated with the calling trunk to the output port associated with the called trunk and the other idle path is used to transfer data words from the input port associated with the called trunk to the output port associated with the calling trunk.

If the above-mentioned comparison step (143) indicates that both parties would normally be associated with the same intermediate buffer memory circuit, an intrabuffer call exists and steps are taken by central processor 150 to avoid the problems of such a call. First, central processor 150 determines by translation which of the time-multiplexed lines 421 and which channel of that time-multiplexed line is associated with the called party (144). When the line and channel designation of the called party is discovered, a control word is prepared for the associated input intrabuffer map memory circuit 203. This control word is transmitted to the input intrabuffer map memory circuit 203 in the manner previously described (145). Central processor 150 also determines by translation the particular time-multiplexed line 710 and channel associated with the called party (146) and prepares a control word for the output buffer map memory circuit 204. This control word is transmitted to the output buffer map memory circuit 204 in a manner previously described (147). On the basis of the time-multiplexed line 421 and channel associated with the called party, central processor 150 computes the identity of the intermediate buffer memory circuit which will be associated with the called party by the operation of input intrabuffer control unit 505. On the basis of this intermediate buffer memory circuit identity, the output buffer memory circuit associated therewith can be determined due to the symmetrical nature of the space-division switch 154. In the manner previously described, central processor 150 selects two simultaneously available network paths through the space-division network in order to interconnect the intermediate buffer memory circuit associated with the calling party and the output buffer memory circuit presently associated with the called party and to connect the intermediate buffer memory circuit associated with the called party to the output buffer memory circuit associated with the calling party.

Furthermore, the central processor 150 computes the necessary signaling information to be transmitted on the called trunk to the distant office and transmits this information to the combined scanner and signal distributor 151. After the necessary acknowledge signals have been received from the destination office, the central processor 150 transmits to the appropriate time-slot memories in the time-slot control unit 200 the information necessary to transfer the data words from the intermediate buffer memory circuit through the network to the output buffer memory circuit. Thereafter, information from the calling trunk is transferred to the called trunk and input information from the called trunk is transferred to the calling trunk once every 125 microseconds until the call is terminated.

The preceding embodiments describe the operation of my invention in conjunction with relatively complex data word distribution, i.e., decorrelator 405. It should be readily apparent that my invention can be employed with arrangements using simpler distribution systems. For example, if the distribution unit allocated incoming data words such that an entire time-multiplexed line 105 would contain nothing but idle channels, an input intrabuffer control unit 505 could be employed which merely switched the called party of an intrabuffer call, as defined by the input intrabuffer map memory 203, to the completely idle time-multiplexed line.

What is claimed is:
1. In combination:
a plurality of data word sources;
a switching network, comprising a plurality of input terminals and a plurality of output terminals, for completing communication paths therebetween;
a plurality of buffer memories, each uniquely associated with one of said input terminals, for storing data words from said data word sources;
means for generating control signals defining two data word sources which are to intercommunicate; and
memory assignment means responsive to said control signals for storing data words from the two data word sources defined by said control signals in different ones of said buffer memories when data words from both of said data word sources would, in the absence of said control signals, be stored in the same one of said buffer memories.

2. The combination in accordance with claim 1 wherein each of said buffer memories comprises a plurality of storage locations and said memory assignment means further comprising:

first distribution means for storing data words from said data word sources in said storage locations in accordance with a first distribution plan wherein data words from each of said data word sources are uniquely associated with one of said storage locations;

means responsive to said control signals for generating intrabuffer signals when the two data word sources defined by said control signals are associated, in accordance with said first distribution plan, with storage locations in the same buffer memory; and intrabuffer control means responsive to said intrabuffer signals for storing data words from a predetermined one of said data word sources defined by said intrabuffer signals in a storage location in a different one of said buffer memories.

3. The combination in accordance with claim 2 wherein the number of data word sources is less than the total number of storage locations in said plurality of buffer memories, whereby at least one of said storage locations is not associated with a data word source by said first distribution means and wherein said memory assignment means further comprises:

means for generating idle location signals identifying idle storage locations in said buffer memories; and said intrabuffer control means further comprises means responsive to said idle location signals for defining a selected one of said idle locations to be said storage location in a different one of said buffer memories.

4. In a time-division switching system comprising a space-division network having a plurality of input terminals, a buffer memory uniquely associated with each of said input terminals, each buffer memory comprising a plurality of storage locations, a plurality of time-multiplexed lines conveying data words in time-separated channels thereon, and means for exchanging data words between two of said time-separated channels defined by control signals; the method of assigning storage locations for data words received on said time-multiplexed lines comprising the steps of:

(1) defining selected ones of said storage locations to be idle storage locations, (2) assigning a unique storage location to each of said time-separated channels on each of said time-multiplexed lines, (3) determining when the two channels defined by said control signals are assigned in step 2 to storage locations in the same buffer memory; and (4) when, in accordance with step 3, two channels are associated with the same buffer memory, assigning one of the channels so associated to an idle location defined by step 1 in a different buffer memory.

5. In combination:

a plurality of time-multiplexed lines for conveying data words in time-separated channels;

means for generating control signals defining two of said time-separated channels, the data words from which are to be interchanged;

a switching network, comprising input and output terminals, for completing communication paths between said input and output terminals in accordance with said control signals;

a first buffer memory uniquely associated with each of said input terminals, each of said first buffer memories comprising a plurality of storage locations for storing data words;

a first distribution means for storing data words from said time-multiplexed lines in said storage locations in accordance with a first distribution plan wherein each of said time-separated channels is uniquely associated with one of said storage locations;

means responsive to said control signals for generating intrabuffer signals associated with each two channels defined by said control signals, the data words from which would be stored in the same first buffer memory, in accordance with said first distribution plan; and means responsive to said intrabuffer signals for storing the data words in time-separated channels associated with said intrabuffer signals in different ones of said first buffer memories.

6. The combination in accordance with claim 5 further comprising:

a second buffer memory uniquely associated with each of said output terminals wherein each of said second buffer memories comprises a plurality of storage locations for storing data words;

means for effectuating the transmission of data words from said first buffer memories to said second buffer memories via said switching network;

second distribution means for transmitting data words from said second buffer memories on the channels of said time-multiplexed lines in accordance with a second distribution plan wherein each of said time-separated channels is uniquely associated with one of said second buffer memory storage locations; and means responsive to said intrabuffer signals for inhibiting the operation of said second distribution means for data words occupying channels associated with said intrabuffer signals and for transmitting such data words in the ones of said channels defined by said control signals.

7. The combination in accordance with claim 5 wherein the number of time-separated channels on said time-multiplexed lines is less than the number of said first buffer memory storage locations, whereby at least one first buffer memory storage location is not associated with a time-separated channel and further comprising:

means for generating idle location signals defining idle locations in said first buffer memories; and means responsive to said idle location signals and said intrabuffer signals for storing a selected one of the data words associated with said intrabuffer signal in an idle storage location.

8. A communication switching network for switching signals from a plurality of communication subscribers comprising:

a plurality of data word sources for generating data words representing signals from said communication subscribers;

means for generating control signals defining a pair of communication subscribers, the data words from which are to be interchanged, said pair of communication subscribers comprising a called subscriber and a calling subscriber;

a switching network, comprising input and output terminals, for completing communication paths between said input and output terminals in accordance with said control signals;

a first buffer memory uniquely associated with each of said input terminals, each of said first buffer memories comprising a plurality of storage locations for storing data words;

first distribution means for storing data words representing signals from said communication subscribers in said first buffer memory storage locations in accordance with a first distribution plan wherein each of said communication subscribers is uniquely associated with one of said first buffer memory storage locations;

means responsive to said control signals for generating intrabuffer signals associated with each pair of communication subscribers defined by said control signals when, in accordance with said first distribution plan, data words representing signals from a pair of communication subscribers would be stored in the same first buffer memory; and means responsive to said intrabuffer signals for storing data words representing signals from the communication subscribers associated with said intrabuffer signals in different ones of said first buffer memories.

9. The combination in accordance with claim 8 wherein said first distribution means stores data words in fewer than all of the storage locations in each of said first buffer memories, said combination further comprising;

means for generating idle location signals defining idle ones of said storage locations and wherein said means responsive to said intrabuffer signals further comprises:

means responsive to said idle location signals for storing data words representing signals from a predetermined one of the communication subscribers associated with said intrabuffer signals, in an idle one of said storage locations.

10. The combination in accordance with claim 9 wherein said means responsive to said idle location signals further includes:

means responsive to said control signals for storing data words representing signals from the called subscriber in said idle storage location.

11. The combination in accordance with claim 8 further comprising:

a second buffer memory uniquely associated with each of said switching network output terminals wherein each of said second buffer memory comprises a plurality of storage locations for storing data words;

means for effectuating the transmission of data words from said plurality of first buffer memories to said plurality of second buffer memories employing said switching network communication paths;

second distribution means for transmitting data words from said second buffer memories to said communication subscribers in accordance with a second distribution plan wherein each of said communication subscribers is uniquely associated with one of said second buffer memory storage locations; and means responsive to said intrabuffer signals for inhibiting the operation of said second distribution means for data words representing signals from communication subscribers associated with said intrabuffer signals and for transmitting such data words to the communication subscribers defined by said control signals.

12. In combination:

timing means for generating timing signals defining time slots of fixed duration;

a plurality of time-multiplexed lines for conveying data words in time-separated channels, each of said time-separated channels having a time duration substantially equal to one of said time slots;

means for generating control signals defining two of said time-separated channels, the data words from which are to be interchanged;

a switching network, comprising input and output terminals, for completing communication paths between said input and output terminals in accordance with said control signals;

a buffer memory uniquely associated with each of said input terminals, each of said buffer memories comprising a plurality of storage locations for storing data words;

means responsive to said timing signals for reading data words from each of said buffer memories once per time slot;

a first distribution means for storing data words from said time-multiplexed lines in said storage locations in accordance with a first distribution plan wherein each of said time-separated channels is uniquely associated with one of said storage locations;

means responsive to said control signals for generating intrabuffer signals associated with each two channels defined by said control signals which, in accordance with said first distribution plan, would be stored in the same buffer memory; and means responsive to said intrabuffer signals for storing the data words in time-separated channels associated with said intrabuffer signals in different ones of said buffer memories.

* * * * *